(12) United States Patent
Friedersdorf et al.

(10) Patent No.: US 8,242,237 B2
(45) Date of Patent: \*Aug. 14, 2012

(54) PHASE SEPARATOR AND MONOMER RECYCLE FOR SUPERCRITICAL POLYMERIZATION PROCESS

(75) Inventors: Chris B. Friedersdorf, Kingwood, TX (US); Patrick Brant, Seabrook, TX (US); Gabor Kiss, Hampton, NJ (US)

(73) Assignee: ExxonMobil Chemical Patents Inc., Houston, TX (US)

( \* ) Notice: Subject to any disclaimer, the term of this patent is extended or adjusted under 35 U.S.C. 154(b) by 346 days.

This patent is subject to a terminal disclaimer.

(21) Appl. No.: 11/854,936

(22) Filed: Sep. 13, 2007

(65) Prior Publication Data

US 2008/0153996 A1 Jun. 26, 2008
US 2011/0313115 A9 Dec. 22, 2011

Related U.S. Application Data

(63) Continuation-in-part of application No. 11/714,546, filed on Mar. 6, 2007, now abandoned, and a continuation-in-part of application No. 60/876,193, filed on Dec. 20, 2006.

(60) Provisional application No. 60/876,193, filed on Dec. 20, 2006, provisional application No. 11/854,936, filed on Sep. 13, 2007, provisional application No. 60/905,247, filed on Mar. 6, 2007.

(51) Int. Cl.
*C08F 6/26* (2006.01)
*C08F 10/06* (2006.01)

(52) U.S. Cl. .......................... 528/501; 526/65

(58) Field of Classification Search ................ 528/501; 526/65

See application file for complete search history.

(56) References Cited

U.S. PATENT DOCUMENTS 2,153,553 A 4/1939 Fawcett et al.
2,852,501 A 9/1958 Richard, Jr. et al.
3,056,771 A 10/1962 Aldridge et al.
3,294,772 A 12/1966 Cottle (Continued)

FOREIGN PATENT DOCUMENTS

CA 2118711 3/1993

(Continued)

OTHER PUBLICATIONS

Suzuki et al., "*Olefin Polymerization Using Highly Congested ansa-Metallocene under High Pressure: Formation of Superhigh Molecular Weight Polyolefins*", Macromolecules, 2000, vol. 33, No. 3, pp. 754-759.

(Continued)

*Primary Examiner* — Fred M Teskin

(57) ABSTRACT

A process for polymerizing olefins, comprising the steps of: (a) contacting in a dense-fluid-homogeneous-polymerization system ("PS"), >30 wt % $C_{3+}$ olefins with: catalyst, activator, 0-50 mol % comonomer, and 0-40 wt % diluent/solvent, at a temperature > PS Tc and a pressure no lower than 1 MPa below the PS cloud point pressure and <200 MPa; (b) forming a reactor effluent comprising polymer-monomer mixture; (c) optionally heating the mixture (b); (d) collecting the mixture (b) in a separation vessel; (e) reducing the pressure to form a two-phase mixture where the pressure in the reactor is 7-100 MPa higher than the pressure in the separation vessel and the temperature in the separation vessel is > the polymer or above 80° C., whichever is higher; (f) separating the monomer-rich phase from the polymer-rich phase; (g) recycling the separated monomer-rich phase and recovering polymer from the polymer-rich phase.

50 Claims, 5 Drawing Sheets

Process configuration for monomer recovery by phase separation

U.S. PATENT DOCUMENTS

| | | |
|---|---|---|
| 3,470,143 A | 9/1969 | Schrage et al. |
| 3,678,088 A | 7/1972 | Hedberg et al. |
| 3,725,378 A | 4/1973 | Chamberlin |
| 4,135,044 A | 1/1979 | Beals |
| 4,153,774 A | 5/1979 | Boettcher et al. |
| 4,337,142 A | 6/1982 | Knudson et al. |
| 4,530,914 A | 7/1985 | Ewen et al. |
| 4,588,790 A | 5/1986 | Jenkins, III et al. |
| 4,740,550 A | 4/1988 | Foster |
| 4,769,510 A | 9/1988 | Kaminsky et al. |
| 4,794,004 A | 12/1988 | Pfleger et al. |
| 4,794,096 A | 12/1988 | Ewen |
| 4,962,262 A | 10/1990 | Winter et al. |
| 5,026,798 A | 6/1991 | Canich |
| 5,081,322 A | 1/1992 | Winter et al. |
| 5,084,534 A | 1/1992 | Welborn, Jr. et al. |
| 5,096,867 A | 3/1992 | Canich |
| 5,236,998 A | 8/1993 | Lundeen et al. |
| 5,272,236 A | 12/1993 | Lai et al. |
| 5,324,799 A | 6/1994 | Yano et al. |
| 5,324,800 A | 6/1994 | Welborn, Jr. et al. |
| 5,326,835 A | 7/1994 | Ahvenainen et al. |
| 5,328,969 A | 7/1994 | Winter et al. |
| 5,332,706 A | 7/1994 | Nowlin et al. |
| 5,352,749 A | 10/1994 | DeChellis et al. |
| 5,382,630 A | 1/1995 | Stehling et al. |
| 5,382,631 A | 1/1995 | Stehling et al. |
| 5,391,654 A | 2/1995 | Ahvenainen et al. |
| 5,405,922 A | 4/1995 | DeChellis et al. |
| 5,408,017 A | 4/1995 | Turner et al. |
| 5,416,153 A | 5/1995 | Winter et al. |
| 5,434,116 A | 7/1995 | Sone et al. |
| 5,455,365 A | 10/1995 | Winter et al. |
| 5,466,766 A | 11/1995 | Patsidis et al. |
| 5,489,659 A | 2/1996 | Sugano et al. |
| 5,504,171 A | 4/1996 | Etherton et al. |
| 5,504,232 A | 4/1996 | Winter et al. |
| 5,514,761 A | 5/1996 | Etherton et al. |
| 5,585,509 A | 12/1996 | Langhauser et al. |
| 5,635,573 A | 6/1997 | Harrington et al. |
| 5,652,308 A | 7/1997 | Merrill et al. |
| 5,670,595 A | 9/1997 | Meka et al. |
| 5,672,668 A | 9/1997 | Winter et al. |
| 5,693,730 A | 12/1997 | Küber et al. |
| 5,693,836 A | 12/1997 | Winter et al. |
| 5,710,223 A | 1/1998 | Fukuoka et al. |
| 5,723,560 A | 3/1998 | Canich |
| 5,723,705 A | 3/1998 | Herrmann et al. |
| 5,756,608 A | 5/1998 | Langhauser et al. |
| 5,763,542 A | 6/1998 | Winter et al. |
| 5,770,753 A | 6/1998 | Kuber et al. |
| 5,780,565 A | 7/1998 | Clough et al. |
| 5,840,644 A | 11/1998 | Küber et al. |
| 5,866,663 A | 2/1999 | Brookhart et al. |
| 5,882,750 A | 3/1999 | Mink et al. |
| 5,936,053 A | 8/1999 | Fukuoka et al. |
| 5,962,719 A | 10/1999 | Winter et al. |
| 5,965,674 A | 10/1999 | Moen et al. |
| 5,969,062 A | 10/1999 | Moll et al. |
| 5,998,547 A | 12/1999 | Hohner |
| 6,028,152 A | 2/2000 | Winter et al. |
| 6,034,022 A | 3/2000 | McAdon et al. |
| 6,051,522 A | 4/2000 | Rohrmann et al. |
| 6,057,408 A | 5/2000 | Winter et al. |
| 6,084,041 A | 7/2000 | Andtsjö et al. |
| 6,084,115 A | 7/2000 | Chen et al. |
| 6,087,292 A | 7/2000 | Winter et al. |
| 6,124,231 A | 9/2000 | Fritze et al. |
| 6,127,493 A | 10/2000 | Maurer et al. |
| 6,143,682 A | 11/2000 | Fisher |
| 6,143,686 A | 11/2000 | Vizzini et al. |
| 6,153,776 A | 11/2000 | Patton et al. |
| 6,160,072 A | 12/2000 | Ewen |
| 6,169,051 B1 | 1/2001 | Mitani et al. |
| 6,197,910 B1 | 3/2001 | Weng et al. |
| 6,207,756 B1 | 3/2001 | Datta et al. |
| 6,218,488 B1 | 4/2001 | Schiffino et al. |
| 6,225,432 B1 | 5/2001 | Weng et al. |
| 6,228,795 B1 | 5/2001 | Vizzini |
| 6,255,410 B1 | 7/2001 | Shigekauzu et al. |
| 6,268,444 B1 | 7/2001 | Klosin et al. |
| 6,291,699 B1 | 9/2001 | Birmingham et al. |
| 6,300,451 B1 | 10/2001 | Mehta et al. |
| 6,326,493 B1 | 12/2001 | Mitani et al. |
| 6,355,725 B2 | 3/2002 | Terano et al. |
| 6,355,741 B1 | 3/2002 | Marechal |
| 6,359,095 B1 | 3/2002 | Winter et al. |
| 6,362,356 B1 | 3/2002 | Repo et al. |
| 6,372,847 B1 | 4/2002 | Wouters |
| 6,399,723 B1 | 6/2002 | Burkhardt et al. |
| 6,451,938 B1 | 9/2002 | Fisher et al. |
| 6,455,638 B2 | 9/2002 | Laughner et al. |
| 6,458,982 B1 | 10/2002 | Schottek et al. |
| 6,465,700 B1 | 10/2002 | Sullivan et al. |
| 6,469,188 B1 | 10/2002 | Miller et al. |
| 6,479,424 B1 | 11/2002 | Ernst et al. |
| 6,479,646 B1 | 11/2002 | Nakano et al. |
| 6,482,902 B1 | 11/2002 | Bohnen et al. |
| 6,492,473 B1 | 12/2002 | Canich et al. |
| 6,492,539 B1 | 12/2002 | Bingel et al. |
| 6,521,727 B2 | 2/2003 | Eilerts et al. |
| 6,525,157 B2 | 2/2003 | Cozewith et al. |
| 6,562,914 B1 | 5/2003 | Andtsjö et al. |
| 6,562,920 B2 | 5/2003 | Brant |
| 6,576,306 B2 | 6/2003 | Mehta et al. |
| 6,583,277 B2 | 6/2003 | Luo et al. |
| 6,620,896 B1 | 9/2003 | Killian et al. |
| 6,635,779 B1 | 10/2003 | Ewen et al. |
| 6,642,316 B1 | 11/2003 | Datta et al. |
| 6,689,847 B2 | 2/2004 | Mawson et al. |
| 6,737,487 B2 | 5/2004 | Meverden |
| 6,749,912 B2 | 6/2004 | Delius et al. |
| 6,770,714 B2 | 8/2004 | Ommundsen et al. |
| 6,881,800 B2 | 4/2005 | Friedersdorf |
| 6,969,490 B2 | 11/2005 | Marx et al. |
| 7,022,780 B2 | 4/2006 | Marx et al. |
| RE39,156 E | 7/2006 | Winter et al. |
| 7,087,690 B2 | 8/2006 | Boussie et al. |
| 7,163,989 B2 | 1/2007 | Friedersdorf |
| 7,214,746 B2 | 5/2007 | Voskoboynikov et al. |
| 7,214,747 B2 | 5/2007 | Voskoboynikov et al. |
| 7,265,193 B2 | 9/2007 | Weng et al. |
| 7,276,567 B2 | 10/2007 | Voskoboynikov et al. |
| 7,279,536 B2 | 10/2007 | Brant et al. |
| 7,319,125 B2 | 1/2008 | Arjunan et al. |
| 7,351,779 B2 | 4/2008 | Iaccino et al. |
| 7,354,979 B2 | 4/2008 | Brant et al. |
| 7,429,634 B2 | 9/2008 | Brant et al. |
| 7,446,216 B2 | 11/2008 | Voskoboynikov et al. |
| 7,538,168 B2 | 5/2009 | Voskoboynikov et al. |
| 7,550,544 B2 | 6/2009 | Voskoboynikov et al. |
| 7,557,171 B2 | 7/2009 | Voskoboynikov et al. |
| 7,667,064 B2 | 2/2010 | Voskoboynikov et al. |
| 7,709,670 B2 | 5/2010 | Voskoboynikov et al. |
| 2001/0031834 A1 | 10/2001 | Ushioda et al. |
| 2001/0044505 A1 | 11/2001 | Ford et al. |
| 2001/0044506 A1 | 11/2001 | Mehta et al. |
| 2001/0053833 A1 | 12/2001 | Nakano et al. |
| 2002/0002261 A1 | 1/2002 | Yahata et al. |
| 2002/0004575 A1 | 1/2002 | Cozewith et al. |
| 2002/0013440 A1 | 1/2002 | Agarwal et al. |
| 2002/0016415 A1 | 2/2002 | Laughner et al. |
| 2002/0065379 A1 | 5/2002 | Murray |
| 2002/0096797 A1 | 7/2002 | Stoffelsma et al. |
| 2002/0156279 A1 | 10/2002 | Boussie et al. |
| 2002/0176974 A1 | 11/2002 | Hanyu et al. |
| 2002/0193535 A1 | 12/2002 | Meverden et al. |
| 2003/0032549 A1 | 2/2003 | Vogel |
| 2003/0088021 A1 | 5/2003 | Van Dun et al. |
| 2004/0024146 A1 | 2/2004 | Friedersdorf |
| 2004/0024148 A1 | 2/2004 | Meverden |
| 2004/0110910 A1 | 6/2004 | Arjunan |
| 2004/0122191 A1 | 6/2004 | Arjunan et al. |
| 2004/0127654 A1 | 7/2004 | Brant et al. |
| 2004/0132935 A1 | 7/2004 | Arjunan et al. |
| 2004/0152882 A1 | 8/2004 | Ekhom et al. |
| 2004/0158010 A1 | 8/2004 | Lehmus et al. |

| Publication No. | Date | Inventor |
|---|---|---|
| 2004/0158015 A1 | 8/2004 | Senninger |
| 2004/0242734 A1 | 12/2004 | Lakeman et al. |
| 2004/0260107 A1 | 12/2004 | Oberhoff et al. |
| 2005/0009993 A1 | 1/2005 | Morioka et al. |
| 2005/0042294 A1 | 2/2005 | Thanoo et al. |
| 2005/0043489 A1 | 2/2005 | Datta et al. |
| 2005/0090384 A1 | 4/2005 | Wang et al. |
| 2005/0113522 A1 | 5/2005 | Datta et al. |
| 2005/0228155 A1 | 10/2005 | Kawai et al. |
| 2006/0009595 A1 | 1/2006 | Rix et al. |
| 2006/0025545 A1 | 2/2006 | Brant et al. |
| 2006/0096175 A1 | 5/2006 | Russell et al. |
| 2006/0134221 A1 | 6/2006 | Geall |
| 2006/0135699 A1 | 6/2006 | Li et al. |
| 2006/0167195 A1 | 7/2006 | Resconi et al. |
| 2006/0178491 A1 | 8/2006 | Canich |
| 2006/0183861 A1 | 8/2006 | Harrington et al. |
| 2006/0183881 A1 | 8/2006 | Ibar |
| 2006/0211832 A1 | 9/2006 | Brant et al. |
| 2006/0281868 A1 | 12/2006 | Sudhin et al. |
| 2006/0293474 A1 | 12/2006 | Brant et al. |
| 2007/0021566 A1 | 1/2007 | Tse et al. |
| 2007/0135596 A1 | 6/2007 | Voskoboynikov et al. |
| 2007/0135597 A1 | 6/2007 | Voskoboynikov et al. |
| 2007/0135623 A1 | 6/2007 | Voskoboynikov et al. |
| 2007/0255018 A1 | 11/2007 | Brant |
| 2008/0090974 A1 | 4/2008 | Brant et al. |
| 2008/0153996 A1 | 6/2008 | Friedersdorf et al. |
| 2008/0153997 A1 | 6/2008 | Casty et al. |
| 2008/0188635 A1 | 8/2008 | Brant et al. |
| 2008/0211832 A1 | 9/2008 | Kumon |
| 2008/0214767 A1 | 9/2008 | Mehta et al. |
| 2008/0234443 A1 | 9/2008 | Kiss et al. |
| 2008/0281040 A1 | 11/2008 | Kiss et al. |
| 2009/0076214 A1 | 3/2009 | Kiss et al. |
| 2009/0076216 A1 | 3/2009 | Kiss et al. |
| 2009/0163642 A1 | 6/2009 | Kiss et al. |
| 2009/0163643 A1 | 6/2009 | Kiss et al. |
| 2009/0163678 A1 | 6/2009 | Kiss et al. |
| 2009/0186995 A1 | 7/2009 | Canich et al. |
| 2009/0292085 A1 | 11/2009 | Kiss et al. |
| 2010/0042379 A1 | 2/2010 | Minnaar et al. |
| 2010/0063338 A1 | 3/2010 | Kiss et al. |

FOREIGN PATENT DOCUMENTS

| | | |
|---|---|---|
| CA | 2103694 | 2/1994 |
| DD | 300291 | 3/1988 |
| DE | 4426569 | 7/1994 |
| DE | 19823168 | 5/1998 |
| EP | 0 089 691 | 9/1983 |
| EP | 0 129 368 | 12/1984 |
| EP | 0 416 815 | 3/1991 |
| EP | 0 480 190 | 4/1992 |
| EP | 0 459 320 | 11/1992 |
| EP | 0 517 183 | 12/1992 |
| EP | 0 530 908 | 3/1993 |
| EP | 0 552 945 | 7/1993 |
| EP | 0 577 581 | 1/1994 |
| EP | 0 582 195 | 2/1994 |
| EP | 0 584 609 | 3/1994 |
| EP | 0 603 232 | 6/1994 |
| EP | 0 628 566 | 12/1994 |
| EP | 0 645 401 | 3/1995 |
| EP | 0 666 267 | 8/1995 |
| EP | 0 667 359 | 8/1995 |
| EP | 0 670 325 | 9/1995 |
| EP | 0 693 502 | 1/1996 |
| EP | 0 714 923 | 6/1996 |
| EP | 0 718 324 | 6/1996 |
| EP | 0 742 227 | 11/1996 |
| EP | 0 806 436 | 11/1997 |
| EP | 0 846 696 | 6/1998 |
| EP | 0 882 078 | 12/1998 |
| EP | 0 882 731 | 12/1998 |
| EP | 0 887 379 | 12/1998 |
| EP | 0 887 380 | 12/1998 |
| EP | 0 942 017 | 9/1999 |
| EP | 0 957 113 | 11/1999 |
| EP | 0 987 279 | 3/2000 |
| EP | 1 008 607 | 6/2000 |
| EP | 1 033 371 | 9/2000 |
| EP | 1 138 687 | 10/2001 |
| EP | 1 193 275 | 4/2002 |
| EP | 1 195 391 | 4/2002 |
| EP | 1 231 226 | 8/2002 |
| EP | 1 323 746 | 7/2003 |
| GB | 1 443 394 | 7/1976 |
| JP | 06-025357 | 2/1994 |
| JP | 07-216011 | 8/1995 |
| JP | 08-127612 | 5/1996 |
| JP | 3323347 | 7/1996 |
| JP | 08-208535 | 8/1996 |
| JP | 08-301914 | 11/1996 |
| JP | 09-216916 | 8/1997 |
| JP | 10-045834 | 2/1998 |
| JP | 10-110003 | 4/1998 |
| JP | 3421202 | 4/1998 |
| JP | 10-176023 | 6/1998 |
| JP | 11-001508 | 1/1999 |
| JP | 11-060588 | 3/1999 |
| JP | 11-080183 | 3/1999 |
| JP | 11-171925 | 6/1999 |
| JP | 2001-206914 | 7/2001 |
| PL | 159518 | 3/1991 |
| PL | 281277 | 3/1991 |
| WO | WO 88/02376 | 4/1988 |
| WO | WO 88/04672 | 6/1988 |
| WO | WO 91/04257 | 4/1991 |
| WO | WO 92/14766 | 9/1992 |
| WO | WO 93/05082 | 3/1993 |
| WO | WO 93/11171 | 6/1993 |
| WO | WO 94/00500 | 1/1994 |
| WO | WO 95/04087 | 2/1995 |
| WO | WO 95/25757 | 9/1995 |
| WO | WO 96/00246 | 1/1996 |
| WO | WO 96/04317 | 2/1996 |
| WO | WO 96/12744 | 5/1996 |
| WO | WO 96/18662 | 6/1996 |
| WO | WO 96/33227 | 10/1996 |
| WO | WO 96/34023 | 10/1996 |
| WO | WO 96/038458 | 12/1996 |
| WO | WO 97/03124 | 1/1997 |
| WO | WO 97/11098 | 3/1997 |
| WO | WO 97/13790 | 4/1997 |
| WO | WO 97/44391 | 11/1997 |
| WO | WO 97/45434 | 12/1997 |
| WO | WO 97/48737 | 12/1997 |
| WO | WO 98/13393 | 4/1998 |
| WO | WO 98/33823 | 8/1998 |
| WO | WO 98/49229 | 11/1998 |
| WO | WO 99/11680 | 3/1999 |
| WO | WO 99/26985 | 6/1999 |
| WO | WO 99/29749 | 6/1999 |
| WO | WO 99/40129 | 8/1999 |
| WO | WO 99/41289 | 8/1999 |
| WO | WO 99/42467 | 8/1999 |
| WO | WO 99/43717 | 9/1999 |
| WO | WO 00/06621 | 2/2000 |
| WO | WO 00/12565 | 3/2000 |
| WO | WO 00/12572 | 3/2000 |
| WO | WO 00/25916 | 5/2000 |
| WO | WO 00/26266 | 5/2000 |
| WO | WO 00/37514 | 6/2000 |
| WO | WO 00/40625 | 7/2000 |
| WO | WO 00/43406 | 7/2000 |
| WO | WO 00/50475 | 8/2000 |
| WO | WO 00/64952 | 11/2000 |
| WO | WO 00/69871 | 11/2000 |
| WO | WO 01/44318 | 6/2001 |
| WO | WO 01/46273 | 6/2001 |
| WO | WO 01/57095 | 8/2001 |
| WO | WO 02/00744 | 1/2002 |
| WO | WO 02/34795 | 5/2002 |
| WO | WO 02/38628 | 5/2002 |
| WO | WO 02/44260 | 6/2002 |
| WO | WO 02/50145 | 6/2002 |
| WO | WO 02/070572 | 9/2002 |
| WO | WO 02/083753 | 10/2002 |

| | | |
|---|---|---|
| WO | WO 02/090399 | 11/2002 |
| WO | WO 02/098930 | 12/2002 |
| WO | WO 03/040095 | 5/2003 |
| WO | WO 03/040195 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 2004/013194 | 2/2004 |
| WO | WO 2004/024740 | 3/2004 |
| WO | WO 2004/026921 | 4/2004 |
| WO | WO 2004/026923 | 4/2004 |
| WO | WO 2004/026925 | 4/2004 |
| WO | WO 2004/033510 | 4/2004 |
| WO | WO 2004/050724 | 6/2004 |
| WO | WO 2004/052950 | 6/2004 |
| WO | WO 2004/060941 | 7/2004 |
| WO | WO 2005/113610 | 12/2005 |
| WO | WO 2005/113615 | 12/2005 |
| WO | WO 2006/002132 | 1/2006 |
| WO | WO 2006/009942 | 1/2006 |
| WO | WO 2006/009944 | 1/2006 |
| WO | WO 2006/009945 | 1/2006 |
| WO | WO 2006/009946 | 1/2006 |
| WO | WO 2006/009949 | 1/2006 |
| WO | WO 2006/009951 | 1/2006 |
| WO | WO 2006/009976 | 1/2006 |
| WO | WO 2006/009977 | 1/2006 |
| WO | WO 2006/009979 | 1/2006 |
| WO | WO 2006/009980 | 1/2006 |
| WO | WO 2006/009981 | 1/2006 |
| WO | WO 2006/019494 | 2/2006 |
| WO | WO 2006/025917 | 3/2006 |
| WO | WO 2006/025949 | 3/2006 |
| WO | WO 2006/028549 | 3/2006 |
| WO | WO 2006/044149 | 4/2006 |
| WO | WO 2006/083303 | 8/2006 |
| WO | WO 2006/097497 | 9/2006 |
| WO | WO 2006/097500 | 9/2006 |
| WO | WO 2006/120177 | 11/2006 |
| WO | WO 2006/130046 | 12/2006 |
| WO | WO 2006/134046 | 12/2006 |
| WO | WO 2007/037944 | 4/2007 |
| WO | WO 2007/107448 | 9/2007 |
| WO | WO 2007/116034 | 10/2007 |
| WO | WO 2009/082468 | 7/2009 |

OTHER PUBLICATIONS

Schaverien et al., "*Ethylene Bis(2-Indenyl) Zirconocene: A New Class of Diastereomeric Metallocenes for the (Co)Polymerization of α-Olefins*", Organometallics, 2001, vol. 20, No. 16, pp. 3436-3452.
Bergemann et al., "*Copolymerization of Ethylene and 1,5-Hexadiene Under High Pressure Catalyzed by a Metallocene*", Journal of Molecular Catalysis A: Chemical 116, 1997, pp. 317-322.
Lehmus et al., "*Metallocene-PP Produced Under Supercritical Polymerization Conditions*", http://www.chemistry.unina.it/jplo/bluesky/first_bluesky/list_of_posters.htm, 2002, pp. 1-11.
Lofgren et al., "Metallocene-PP Produced Under Supercritical Conditions", 1st Blue Sky Conference on Catalytic Olefin Polymerization, Jun. 17-20, 2002, Sorrento, Italy, 2002.
Alt et al., "*Effect of the Nature of Metallocene Complexes of Group IV Metals on Their Performance in Catalytic Ethylene and Propylene Polymerization*", Chemical Reviews, 2000, vol. 100, No. 4, pp. 1205-1221.
Akimoto et al., "*New Developments in the Production of Metallocene LLDPE by High-pressure Polymerization*", Metallocene-Based Polyolefins, 2000, pp. 287-308.
Barnhart et al., "*Synthesis of Branched Polyolefins Using a Combination of Homogeneous Metallocene Mimics*", Journal American Chemical Society, 1998, vol. 120, No. 5, pp. 1082-1083.
Bergemann et al., "*Copolymerization of Ethylene and Linear 1-Olefins with a Metallocene Catalyst System under High Pressure, Part II. Comparison of Propene, 1-Butene, 1-Hexene, and 1-Decene*" Journal of Molecular Catalysis A: Chemical 105, 1996, pp. 87-91.
Britovsek et al., "*The Search for New-Generation Olefin Polymerization Catalysts*: Life Beyond Metallocenes", Angew. Chem. Int. Ed., 1999, vol. 38, pp. 428-447.
Bujadoux, "Use of Bridged and Non-Bridged Metallocene Catalysts in High Pressure/High Temperature Ethylene/a-Olefin Copolymerization", Metallocenes '95, 1995, pp. 375-402.
Chen et al., "*Cocatalysts for Metal-Catalyzed Olefin Polymerization: Activators, Activation Processes, and Structure-Activity Relationships*", Chemical Reviews, 2000, vol. 100, No. 4, pp. 1391-1434.
Coates, "*Precise Control of Polyolefin Stereochemistry Using Single Site Metal Catalysts*", Chemical Reviews, 2000, vol. 100, No. 4, pp. 1223-1252.
Cottom, "*Waxes*", in Encyclopedia Chem. Tech., 4th Ed., vol. 25, pp. 614-626, (1991).
Eckstein et al., "*Determination of Plateau Moduli and Entanglement Molecular Weights of Isotactic, Syndiotactic, and Atactic Polypropylenes Synthesized with Metallocene Catalysts*", Macromolecules, 1998, vol. 31, No. 4, pp. 1335-1340.
Ewen et al., "*Syndiospecific Propylene Polymerizations with Group 4 Metallocenese*", Journal American Chemical Society, 1988, vol. 110, pp. 6255-6256.
Gotz et al., "*MAO-Free Metallocene Based Catalysts in High Pressure Polymerization of Ethylene and 1-Hexene*", Chem. Eng. Technol. 21, 1998, vol. 12, pp. 954-957.
Hauptman, et al., "*Stereoblock Polypropylene: Ligand Effects on the Stereospecificity of 2-Arylindene Zirconocene Catalysts*", J. Am. Chem. Soc., 1995, vol. 117, No. 46, pp. 11586-11587.
Ittel, et al., "*Late metal Catalysts for Ethylene Homo- and Copolymerization*", Chemical Reviews, 2000, vol. 100, No. 4, pp. 1169-1203.
Janiak, "*Metallocene Catalysts for Olefin Polymerization, Metallocenes: Synthesis, Reactivity, and Applications*", Metallocenes, 1998, vol. 2, pp. 547-623.
Walther et al., "*Metallocene-Catalyzed Polymerisation in Supercritical Propylene*", 4th International Symposium on High Pressure Process Technology and Chemical Engineering, Sep. 22-25, 2002, Venice, Italy, pp. 1-7.
Luft, "*Development of Metallocene Catalysts and Their Application in the High Pressure Polymerisation Process*", PE 1999 World Congress Global Technology Update Forum, Mar. 15-16, 1999, Zurich, Switzerland, pp. 1-19.
Resconi et al., "*Selectivity in Propene Polymerization with Metallocene Catalysts*", Chemical Reviews, 2000, vol. 100, No. 4, pp. 1253-1345.
Scollard et al., "*Polymerization of α-Olefins by Chelating Diamide Complexes of Titanium*", Macromolecules, 1996, vol. 29, No. 15, pp. 5241-5243.
Smith et al., "*Thermodynamic Data for Pure Compounds Part A, Hydrocarbons and Ketones Physical Sciences Data*", 1986, vol. 25, Elsevier, New York, 1986, pp. 308-309.
Stephenson et al., "*Handbook of the Thermodynamics of Organic Compounds*", Elsevier Science Publ. NY, p. 75 (1987).
Stratton, "*Waxes*", in Encyclopedia Polymer Science and Eng., 2nd Edition, vol. 17, pp. 784-795 (1985).
Yano et al., "*Homo- and Copolymerization of Ethylene at High TemRerature with Cationic Zirconocene Catalysts*", Macromol. Chem. Phys. 200, No. 4, pp. 917-923 (1999).
Yano et al., "*Homo- and Copolymerization of Ethylene at by Cationic Hafnocene Catalysts based on Tetrakis(pentafluorophenyl) borate*", Macromol. Chem. Phys. 200, No. 4, 1999, pp. 924-932.
Yano et al., "*Novel Zirconocene Catalysts for the Production of High Molecular Weight LLDPE in High Temperature Polymerization*", Macromol. Chem. Phys. 200, No. 4, 1999, pp. 933-941.
Bergemann et al., "*Copolymerization of Ethylene and Linear 1-olefins with a Metallocene Catalyst System Under High Pressure. Part I. Copolymerzation of Ethylene and Propene*", Journal of Molecular Catalysis A: Chemical 102, 1995, pp. 1-5.
U.S. Appl. No. 60/937,929, filed Jun. 29, 2007.
U.S. Appl. No. 61/004,336, filed Nov. 27, 2007.
U.S. Appl. No. 12/074,496, mailed Mar. 4, 2008, Gabor Kiss et al.
U.S. Appl. No. 60/933,007, mailed Jun. 4, 2007, Brant et al.
U.S. Appl. No. 60/937,929, mailed Jun. 29, 2007, Kiss et al.
U.S. Appl. No. 60/004,336, mailed Nov. 27, 2007, Deffenbaugh et al.
Author Unknown, Operation of the Reactor with a Sealed Electric Motor in Manufacture of Ditolyethane, (Sep. 1965).

Author Unknown, "Propylene Supercritical Polymerization Tests in Yangzi Make Breakthrough" China Chemical Reporter, vol. 15, Apr. 6, 2005.

Alt et al., Effect of the Nature of Metallocene Complexes of Group IV Metals on Their Performance in Catalytic Ethylene and Propylene Polymerization, Chem. Rev. 100, 2000, pp. 1205-1221.

Alt et al., Syndiospecific Polymerization of Propylene: Synthesis of $CH_2$- and CHR-Bridged Fluorenyl-Containing Ligand Precursors for Metallocene Complexes of Type $(C_{13}H_{8-n}R'_n CHR-C_5H_4)ZrCl_2$ (n = 0, 2; R = H, Alkyl; R' = H, Hal), Journal of Organometallic Chemistry, 1996, vol. 526, No. 2, pp. 295-301.

Alt et al., Syndiospezifische Polymerisation von Propylen: 2- und 2,7 —substituierte Metallocenkomplex des typs $(C_{13}H_{8-n}R'_n CHR-C_5H_4)MCl_2$(n =1,2; R =Alkoxy, Alkyl, Aryl, Hal; R'=Me, Ph; M = Zr, Hf)[1], Journal of Organometallic Chemistry, 1996, vol. 522, No. 1, pp. 3954.

Akimoto et al., New Developments in the Production of Metallocene LLDPE by High pressure Polymerization, Tosoh Corp., Metallocene-Based Polyolefins 2000 (conference proceedings), pp. 287-308 (John Wiley & Sons Ltd.).

Bandy et al., Polymerisation of Ethylene and Propene Using New chiral Zirconium Derivatives, Crystal Structure of $[ZrL^1Cl_2][H_2L^1=(4S,5S)$-trans-4,5-bis(1H-inden-l-ylmethyl)-2,2-dimethyl1,3-dioxoland], J. Chem. Soc., Dalton Trans., 1991, pp. 2207-2216.

Barnhart et al., Synthesis of Branched Polyolefins Using a Combination of Homogeneous Metallocene Mimics, J. Am. Chem. Soc., 1998, vol. 120, pp. 1082-1083.

Bergemann et al., Copolymerization of Ethylene and Linear a-Olefins with a Metallocene Catalyst System under High Pressure, Part II. Comparison of Propene, 1-Butene, 1-Hexene, and 1-Decene, J. Mol. Catal. A: Chemical 105, 1996, pp. 87-91.

Bergemann et al., Copolymerization of Ethylene and 1,5-Hexadiene Under High Pressure Catalyzed by a Metallocene, Journal of Molecular Catalysis a: Chemical, 116, 1997, pp. 317-322.

Bergemann et al., Journal of Molecular Catalysis A: Chemical 102, 1995, pp. 1-5.

Britovsek et al., the Search for New-Generation Olefin Polymerization Catalysts: Life Beyond Metallocenes, Chemie Intl. Edn., 1999, vol. 38, pp. 428-447.

Bujadoux, Use of Bridged and Non-Bridged Metallocene Catalysts in High Pressure/High Temperature Ethylene/α-Olefin Copolymerization, Metallocenes 95 Intl. Congr., Metallocene Polym., 1995, pp. 375-402, Scotland Bus. Rsrch. Publ.

Chen et al., Cocatalysts for Metal-Catalyzed Olefin Polymerization: Activators, Activation Processes, and Structure-Activity Relationships, Chem. Rev., 2000, vol. 100, pp. 1391-1434.

Coates, et al., Oscillating Stereocontrol: a Strategy for the Synthesis of Thermoplastic Elastomeric Polypropylene, Science, 1995, vol. 267, pp. 217-219.

Coates, Precise Control of Polyolefin Stereochemistry Using Single Site Metal Catalysts, Chem. Rev. 100, 2000, pp. 1223-1252.

Conway et al., Formation and Reactivity of Halogen Derivatives of (775- Cyclopentadienyl)thallium, Organometallics, 1985, vol. 4, pp. 688-693.

Cottom, Waxes, in Encyclo. Chem. Tech., vol. 25, pp. 614-626, 4[th]Ed. (1991).

Dassaud et al., Copolymerization of Propene-Nonconjugated Dienes: Derivatization Through Hydroboration and Epoxydation, Polym. Adv. Technol., 4(7), 1993, pp. 457-464.

Dreier, et al., 2-Hetaryl-Substituted Bis(indenyl)zirconium Complexes as Catalyst Precursors for Elastomeric Polypropylene Formation, Organometallics, 2000, vol. 19, pp. 4095-4103.

Dreier, et al., Group 4 Metallocenes Containing Hetaryl Substituents at Their it-ligands: Synthesis and Characterization of the Parent bis[2-(2-furyl)indenyl]zirconocene system, J. Organometallic Chem., 2001, vol. 622, pp. 143-148.

Dreier, et al., Conformational features of a furyl-substituted bis(tetrahydroindynyl)zirconium dichloride system, J. Phys. Org. Chem., 2002, vol. 15, pp. 582-589.

Dreier et al., Structural and Dynamic Features of Bis[2-(2-furyl)indenyl]zirconium Derivatives, Organometallics, 2001, vol. 20, pp. 5067-5075.

Eckstein et al., Determination of Plateau Moduli and Entanglement Molecular Weights of Isotactic, Syndiotactic, and Atactic Polypropylenes Synthesized with Metallocene Catalysts, Macromolecules, 31, 1998, pp. 1335-1340.

Erker et al., Hydroboration of Bis(alkenylcyclopentadienyl)zirconium Dichlorides1), Chemische Berichte, 1991, vol. 124, pp. 1301-1310.

Erker et al., Cp-Substituent Additivity Effects controlling the Stereochemistry of the Propene Polymerization Reaction at Conformationally Unrestricted (CpCHR1R2)2ZrC12/ Methylalumoxane Catalysts, J. Am. Chem. Soc., 1991, vol. 113, pp. 7594-7602.

Erker et al., Synthesis of ansa-Metallocenes by Intramolecular Photochemical [2 + 2] Cycloaddition of Bis(alkenylcyclopentadienyl)zirconium Complexes, Organometallics, 1993, vol. 12, pp. 2140-2151.

Ewen et al., Syndiospecific Propylene Polymerizations with Group 4 Metallocenese, J. Am. Chem. Soc., 1988, vol. 110, pp. 6255-6256.

Finch et al., Substituent Effects on the cleavage Rates of Titanocene Metallacyclobutanes, Journal of the American Chemical Society, Washington, DC, US, 1998, vol. 110, pp. 24062413.

Gotz et al., MAO-Free Metallocene Based Catalysts in High Pressure Polymerization of Ethylene and 1-Hexene, Chem. Eng. Technol., 21, 1998, pp. 954-957 (Wiley-VCH Verlag GmbH).

Hackmann et al., functional Olefin Copolymers: Uniform Architectures of Propene/7-Methyl1,6-Octadiene Copolymers by ATR-FTIR Spectroscopy Control of Monomer Composition, Macromolecules, American Chemical Society, Easton, US, vol. 33, No. 5, Mar. 7, 2000, pp. 1524-1529 (German).

Hackmann et al., Zirconocene-Mao Catalyzed Homo- and Copolymerizations of Linear Assymetrically Substituted Dienes with Propene: A Novel Strategy of Functional (co)poly(aolefin)s, Macromol. Chem. Phys., 1998, pp. 1511-1517 (German).

Han et al., Permercuration of Ferrocenes and Ruthenocenes. New Approaches to Complexes Bearing Perhalogenated Cyclopentadienyl Ligands, Organometallics, 1994, vol. 13, No. 8, pp. 3009-3019.

Hassan et al., Aryl-Aryl Bond Formation One Century after the Discovery of the Ullmann Reaction, Chem. Rev., 2002, vol. 102, pp. 1359-1469.

Hauptman, et al., Stereoblock Polypropylene: Ligand Effects on the Stereospecificity of 2- Arylindene Zirconocene Catalysts, J. Am. Chem. Soc., 1995, vol. 117, pp. 11586-11587.

Hollis et al., Preparation and Properties of (S,S)-[Ti((R,R)-cyclacene)C12], a Chiral Strapped Bent Metallocene, Organometallics, 1992, vol. 11, pp. 2812-2816.

Ittel, et al., Late metal Catalysts for Ethylene Homo- and Copolymerization, Chem. Rev. 2000, vol. 100, pp. 1169-1203.

Janiak, Metallocene Catalysts for Olefin Polymerization, Metallocenes: Synthesis, Reactivity, and Applications, vol. 2, Wiley-VCH, 1998, pp. 547-614, A. Togni and R. L. Halterman, editors.

Johnston et al., Investigation of the Electrochemical Properties of Substituted Titanocene Dichlorides, Electrochemica Acta, 1995, vol. 40, pp. 473-477.

Kamigaito et al., Olefin Polymerization with Me4Cp-amido Complexes with Electron-withdrawing Groups, Journal of Polymer Science, Part A: Polymer Chemistry, 2000, vol. 38, No. 51, pp. 4649-4660.

Kato et al., Synthesis of Novel ansa-Metallocene Complex with Bridged Bis(indenyl) Ligand and Its Application for Olefin Polymerization, Studies in Surface and Catalysis, 1999, vol. 121 (Science and Technology in Catalysis (1998), pp. 473-476.

Kirby et al., Phase Behavior of Polymers in Supercritical Fluid Solvents, Chem. Rev., 1999, 99, pp. 565-602.

Kniippel, et al., Probing the Dynamic Features of Bis(aminocyclopentadienyl) and Bis(aminoindenyl) Zirconium Complexes, Organometallics, 2000, vol. 19, pp. 1262-1268.

Kravchenko, et al., Propylene Polymerization with Chiral and Achiral Unbridged 2-Arylindene Metallocenes, Organometallics, 1997, vol. 16, pp. 3635-3639.

Lahelin et al., Propylene Polymerization with rac -SiMe2(2-ME-4-Phlnd)2ZrMe2/Mao: Polymer Characterization and Kinetic Models, Macromol. Chem. Phys., 2003, v. 204, pp. 1323-1337.

Larsonneur et al., Synthesis, Characterization, and Chemical Reactivity of Zirconium Dihydride [(C5H4R)2Zr(11-H)H2 (R = SiMe3, CMe3). H/D Exchange Reactions of Anionic Species [($C_5$ $H_4$ $R)_2$X-ray Crystal Structure of [Zr(u-H)H]$_2$.(C5H4SiMe3)2Zr(p-H)H]2, Organometallics, 1993, vol. 12, pp. 3216-3224.

Lee et al., Copolymerizations of Olefins and Dienes with Homogeneous and Heterogeneous Catalysts, Eur. Polym. J., vol. 33(4), 1997, pp. 447-451 (German).

Lehmus et al., Metallocene-PP Produced Under Supercritical Polymerization Conditions, http://www.chemistry.unina.it/jlpo/bluesky/first_bluesky/list_of_posters.htm pp. 1-10.

Linnolahti et al., theoretical Study on the Factors Controlling the Accessibility of Cationic Metal Centers in Zirconocene Polymerization Catalysts, Macromolecules, 2000, vol. 33, pp. 92059214.

Lofgren et al., Metallocene-pp. Produced Under Supercritical Conditions, 1st Blue Sky Conference on Catalytic Olefin Polymerization, Jun. 17-20, 2002, Sorrento, Italy, 2002.

Luft, Development of Metallocene Catalysts and Their Application in the High Pressure Polymerisation Process, Darmstadt University of Technology, PE 1999, World Congress Global Technology Update Forum, Mar. 15-16, 1999, Zurich, Switzerland.

Ogasawara et al., Metathesis Route to Bridged Metallocenes, J. Am. Chem. Soc., 2002, vol. 124, pp. 9068-9069.

Piccolrovazzi et al., Electronic Effects in Homogeneous Indenylzirconium Ziegler-Natta Catalysts, Organometallics, 1990, vol. 9, No. 12, pp. 3098-3105.

Plenio, et al., Aminozirconocenes: A New class of Zirconocenese with a Nitrogen Atom Directly Bonded to an ri5-cyclopentadienyl (indenyl) ligand, J. Organometallic Chem., 1996, vol. 519, pp. 269-272.

Rausch et al., the Formation of Ring-substituted Titanocene Derivatives Containing Chloro and Carbomethoxy Substituents, Journal of Organometallic Chemistry, Elsevier-Sequoia S.A. Lausanne, CH, Dec. 20, 1988, vol. 358, No. 103, pp. 161-168.

Resconi et al., Selectivity in Propene Polymerization with Metallocene Catalysts, Chem. Rev. 2000, vol. 100, pp. 1253-1345.

Resconi et al., Highly Regiospecific Zirconocene Catalysts for the Isospecific Polymerization of Propene, J. Amer. Chem. Soc., 1998, 120, pp. 2308-2321.

Resconi et al., rac-[Methylene(3-tert-butyl-1-indenyl)2]ZrC12: A Simple, High-Performance Zirconocene Catalyst for Isotactic Polypropene, Organometallics, 2000, 19, pp. 420-429.

Rheingold et al., Preparation and Properties of Chiral Titanocene and Zirconocene Dichloride Complexes of a Chiral Ligand, Organometallics, 1992, vol. 11, pp. 1869-1876.

Ryabov et al., Zirconium Complexes with Cyclopentadienyl Ligands Involving Fused a thiophene Fragment, Organometallics, 2002, vol. 21, pp. 2842-2855.

Schäfer et al., ansa-Metallocene Derivatives, XII. Diastereomeric Derivatisation and Enantiomer Separation of Ethylenebis (Tetrahydroindenyl)-Titanium and -Zirconium Dichlorides, Journal of Organometallic Chemistry, 1987, vol. 328, No. 1-2, pp. 87-99.

Schaverien et al., Ethylene Bis(2-Indenyl)Zirconocene: A New Class of Diastereomeric Metallocenes for the (Co) Polymerization of Alpha-Olefins, Organometallics, vol. 20, No. 16, 2001, pp. 3436-3452.

Schmid et al., Unbridged Cyclopentadienyl-fluorenyl Complexes of Zirconium as Catalysts for Homogeneous Olefin Polymerization, Journal of Organometallic Chemistry, 1995, vol. 501, No. 1-2, pp. 101-106.

Scollard et al., Polymerization of α-Olefins by Chelating Diamid Complexes of Titanium, Macromolecules, 1996, vol. 29, pp. 5241-5243.

Siedle et al., Synthesis of Unsymmetrical Ansa-Fluorenyl Metallocenes, Journal of Molecular Catalysis, 2004, vol. 214, No. 2, pp. 187-198.

Smith et al., Thermodynamic Data for Pure Compounds Part A, Hydrocarbons and Ketones Physical Sciences Data, vol. 25, Elsevier, New York, 1986, pp. 308-309.

Spalek et al., the Influence of Aromatic Substituents on the Polymerization Behavior of Bridged Zirconocene Catalysts, Organometallics, 1994, 13, pp. 954-963.

Stephenson et al., Handbook of the Thermodynamics of Organic Compounds, Elsevier Science Publ. NY, p. 75, 1987.

Spalek et al., The Influence of Aromatic Substituents on the Polymerization Behavior of Bridged Zirconocene Catalysts, Organomatallics, 1994, 13, pp. 954-963.

Suzuki et al., Olefin Polymerization Using Highly Congested ansa-Metallocene under High Pressure: Formation of Superhigh Molecular Weight Polyolefins, Macromolecules, 2000, vol. 33, pp. 754-759.

Yamasaki et al., Novel High performance ansa -Zirconocene Catalysts for Isospecific Polymerization of Propylene, Chem. Letters, 1999, pp. 1311-1312.

Yano et al., Homo- and Copolymerization of Ethylene at High Temperature with Cationic Zirconocene Catalysts, Macromol. Chem. Phys. 200, No. 4, pp. 917-923 (Wiley-VCH Verlag GmbH, 1999).

Yano et al., Homo- and Copolymerization of Ethylene at by Cationic Hathocene Catalysts based on Tetrakis(pentafluorophenyl), Macromol. Chem. Phys. 200, No. 4, 1999, pp. 924-932 (Wiley-VCH Verlag GmbH).

Yano et al., Novel Zirconocene Catalysts for the Production of High Molecular Weight LLDPE in High Temperature Polymerization, Macromol. Chem. Phys. 200, No. 4, 1999, pp. 933-941 (Wiley-VCH Verlag GmbH).

Yano et al., Ethylene/1-Hexene Copolymerization with Ph$_2$C(Cp)(Flu)ZrCl$_2$Derivatives: Correlation Between Ligand Structure and Copolymerization Behavior at High Temperature, Macromolecular Chemistry and Physics, 1999, vol. 200, No. 6, pp. 1542-1553.

Waldbaum et al., Novel Organoiron Compounds Resulting From the Attempted Syntheses of Dibenzofulvalene Complexes, Inorganica Chimica Acta, 1999, vol. 291, No. 1-2, pp. 109-126.

Walther et al., Metallocene-Catalyzed Polymerisation in Supercritical Propylene, Sep. 22- 25, 2002, Venice, Italy, High Pressure in Venice, 4th International Symposium on High Pressure Process Technology and Chemical Engineering.

Wild et al., ansa-Metallocene Derivatives, IV, Synthesis and Molecular Structures of Chiral ansa-Titanocene Derivatives with Bridged Tetrahydroindenyl Ligands, Journal of Organometallic Chemistry, 1982, vol. 232, pp. 233-247.

Wunderlich, Editor, Thermal Analysis, Academic Press Inc., 1990, pp. 418.

Nadella et al., "*Melt Spinning of Isotactic Polypropylene: Structure Development and Relationship to Mechanical Properties*", Journal of Applied Polymer Science, 1977, vol. 21, No. 11, pp. 3003-3022.

Resconi et al., "*Effect of Monomer Concentration on Propene Polymerization with the rac-[Ethlenebis(1-indenyl)]zirconium Dichloride/Methylaluminoxane Catalyst*", Macromolecules, 1995, vol. 28, No. 19, pp. 6667-6676.

Seraidaris et al., "*Copolymerization of Propane with Low Amounts of Ethene in Propene Bulk Phase*", Polymer, 2006, vol. 47, No. 1, pp. 107-112.

Han et al., *How to Solute Polydispersity Affects the Cloud-Point and Coexistence Pressures in Propylene and Ethylene Solutions of Alternating Poly(ethylene-co-propylene)*, Ind. Eng. Chem. Res., 1997, vol. 36, No. 12, pp. 5520-5525.

Koak et al., *High-Pressure Phase Behavior of the Systems Polyethylene + Ethylene and Polybutene + 1-butene*, Fluid Phase Equilibria, 1999, vol. 158-160, pp. 835-846.

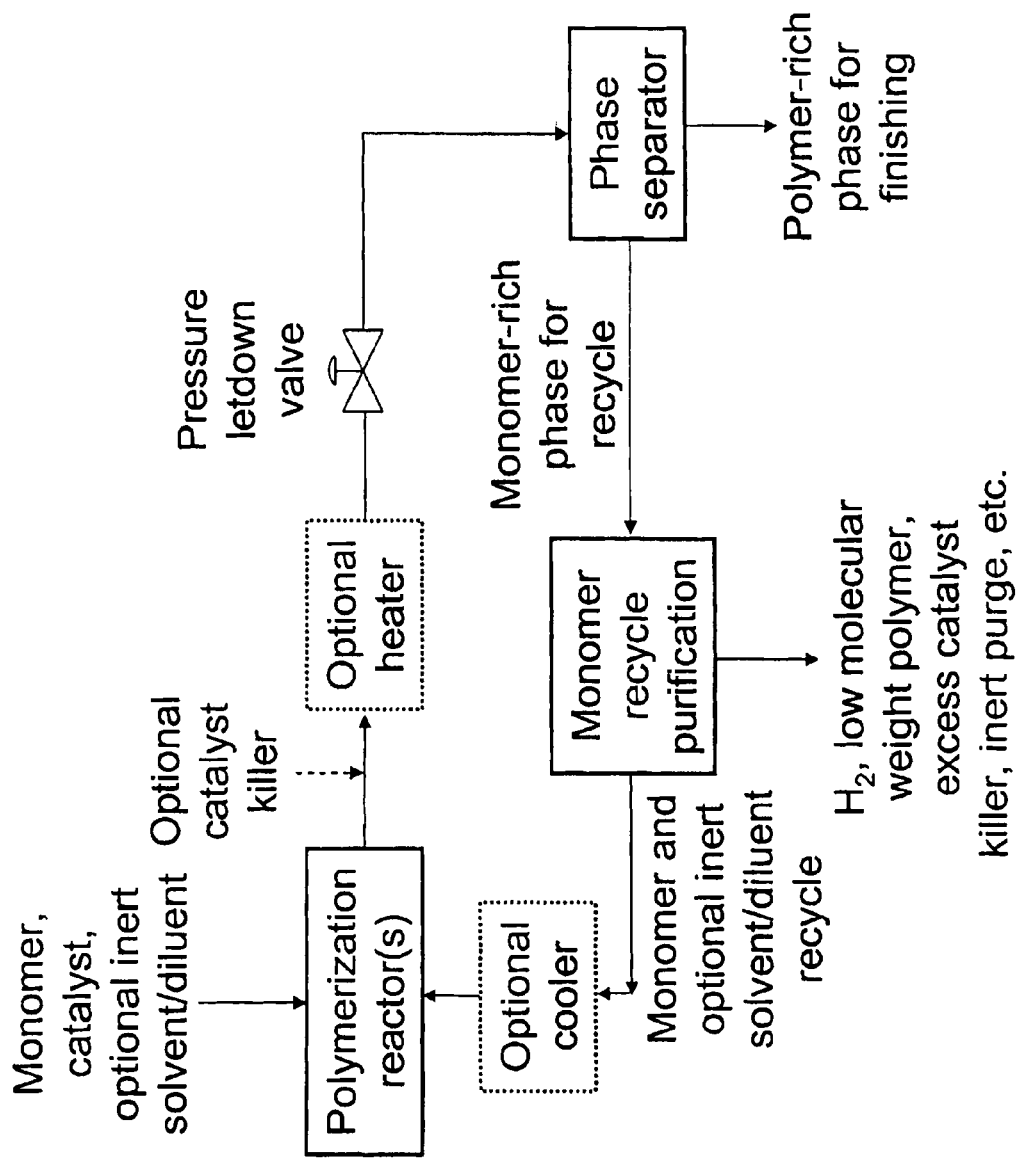
Figure 5. Process configuration for monomer recovery by phase separation

PHASE SEPARATOR AND MONOMER RECYCLE FOR SUPERCRITICAL POLYMERIZATION PROCESS

PRIORITY CLAIM

This application is a continuation in part of U.S. Ser. No. 11/714,546, filed Mar. 6, 2007, which claims priority to and the benefit of U.S. Ser. No. 60/876,193, filed Dec. 20, 2006. This application also claims priority to and the benefit of U.S. Ser. No. 60/905,247, filed Mar. 6, 2007. This application also claims priority to and the benefit of U.S. Ser. No. 60/876,193, filed Dec. 20, 2006.

CROSS-REFERENCE TO RELATED APPLICATIONS

This application is related to U.S. patent application Ser. No. 11/177,004, filed Jul. 8, 2005, which is a Continuation-in-Part of U.S. patent application Ser. No. 10/667,585, filed Sep. 22, 2005, and U.S. patent application Ser. No. 10/667,586, filed Sep. 22, 2005. This invention is also related to U.S. Provisional Application Ser. No. 60/586,465, filed Jul. 8, 2004, U.S. Provisional Application Ser. No. 60/412,541, filed Sep. 20, 2002, and U.S. Provisional Application Ser. No. 60/431,077, filed Dec. 5, 2002.

FIELD OF THE INVENTION

This invention relates to polymerization of olefin monomers under supercritical conditions, in which the principal monomer has three or more carbon atoms. In particular, it relates to the separation of the polymeric product from the low molecular weight components of the polymerization system, and the recycle of the low molecular weight components to the polymerization system.

BACKGROUND OF THE INVENTION

Since the mid-1980s metallocene catalysts have been used in high-pressure reactors—mainly for producing ethylene-backbone polymers (polyolefins where ethylene is the principal monomer), including ethylene copolymers with co-monomers including one or more of propylene, butene, and hexene, along with other specialty monomers such as 4-methyl-1,5-hexadiene. For example, U.S. Pat. No. 5,756,608 to Langhausen et al., reports a process for polymerizing $C_2$ to $C_{10}$ 1-alkenes using bridged metallocene catalysts. Until recently, polypropylene production under homogeneous supercritical conditions has been seen as impractical and unworkable, due to a lack of catalyst systems that could produce commercially useful polypropylene at temperatures much above the critical temperature and above the solid-fluid phase transition temperature. However, a process to produce commercially useful polypropylene (and other related polymers) in a high pressure system has now been disclosed in WO2004/026921, which provides advantages, such as increased catalyst productivity, higher throughput, shorter residence times, etc. Likewise, new propylene-based polymers with tailored composition and/or molecular weight distributions were disclosed. Thus there is now a need in the art to develop new processes capable of greater economy and efficiency in the separation of the polymers of this new process from the low molecular weight components of the polymerization process, and, preferably, of economically recycling those low molecular weight components to the polymerization system feed.

WO 1993/11171 discloses a polyolefin production process that comprises continuously feeding olefin monomer and a metallocene catalyst system into a reactor. The monomer is continuously polymerized to provide a monomer-polymer mixture. Reaction conditions keep this mixture at a pressure below the system's cloud point pressure, and thus create a two-phase reaction mixture consisting of a polymer-rich and a monomer-rich phase. The reaction temperature is also maintained above the polymer's melting point.

WO 1992/14766 discloses a process comprising the steps of (a) continuously feeding olefinic monomer and a catalyst system, with a metallocene component and a cocatalyst component, to the reactor; (b) continuously polymerizing that monomer in a polymerization zone reactor under elevated pressure; (c) continuously removing the polymer/monomer mixture from the reactor; (d) continuously separating monomer from molten polymer; (e) reducing pressure to form a monomer-rich and a polymer-rich phase; and (f) separating monomer from the reactor. WO 1992/14766 focuses on catalyst killing systems for ethylene-rich polymers and neither discloses single-phase polymerization conditions for producing commercially useful propylene-based polymers, nor describes how to obtain the economic benefits of low energy consumption and low plant investment via fluid-liquid phase separation of propylene-based polymers under supercritical conditions.

WO2004/026921 discloses a process to polymerize a range of olefins having three or more carbon atoms, and optionally a wide range of olefin and/or diolefin comonomers, with a catalyst compound (such as a metallocene), activator, and optionally diluent or solvent, at a temperature above the crystallization temperature of the polymerization system and a pressure no lower than 10 MPa below the cloud point pressure of the polymerization system, where the polymerization system comprises any comonomer present, any diluent or solvent present, the polymer product, where the olefins having three or more carbon atoms are present at 40 weight % or more. Thus, WO2004/026921 teaches a polymerization process for making commercially useful propylene-rich (or higher alpha-olefin-rich) polymers under a wide range of supercritical operating conditions, including both single and two-phase reaction systems, with or without use of an inert solvent component, where the polymer is in solution, i.e. is dissolved in either the single phase reaction medium, or predominantly in one of the two phases in a two phase system. The current invention presents a process for the efficient and economical separation of the polymer from the lower molecular weight components of the reaction medium and for economical recycle of the lower molecular weight components to the polymerization system feed, useful in the polymerization system described in WO2004/026921.

U.S. Pat. No. 6,881,800, U.S. Pat. No. 7,163,989 and WO2002/034795 (by Friedersdorf) describe a polymerization system for a wide variety of polyolefin polymers, including propylene-rich polymers, with metallocene catalyst systems. However, because the systems described are solvent based systems, the polymerization system pressure range that is disclosed is from 7.5 to 20 MPa, which is below the range of the current invention (20 to 200 MPa).

Despite these advances in the art, there remains a need for polymerization processes that provide commercially useful propylene-rich polymers, especially those having high molecular weight and high crystallinity, prepared at higher temperatures and productivities than otherwise possible, while providing for the economic separation of monomer from polymer, i.e. with low capital investment and low energy consumption, thus affording advantaged product separation and monomer recycle.

SUMMARY OF THE INVENTION

This invention relates to a process for polymerizing olefins, comprising the steps of:
(a) contacting in one or more reactors, in a dense fluid homogeneous polymerization system, olefin monomers having three or more carbon atoms present at 30 weight % or more (based upon the weight of the monomers and comonomers entering the reactor), with: 1) one or more catalyst compounds, 2) one or more activators, 3) from 0 to 50 mole % comonomer (based upon the amount of the monomers and comonomers entering the reactor), and 4) 0 to 40 wt % diluent or solvent (based upon the weight of the polymerization system), at a temperature above the crystallization temperature of the polymerization system and a pressure no lower than 10 MPa (preferably no lower than 1 MPa) below the cloud point pressure of the polymerization system and less than 200 MPa, where the polymerization system comprises the monomers, any comonomer present, any diluent or solvent present, any scavenger present, and the polymer product;
(b) forming a reactor effluent comprising a polymer-monomer mixture;
(c) optionally heating the polymer-monomer mixture of (b) after it exits the reactor and before or after the pressure is reduced in step (e);
(d) collecting the polymer-monomer mixture of (b) in a separation vessel;
(e) reducing the pressure of the reactor effluent comprising the polymer-monomer mixture of (b) below the cloud point pressure to form a two-phase mixture comprising a polymer-rich phase and a monomer rich phase either before or after collecting the polymer-monomer mixture in the separation vessel where the pressure in the reactor (or at least one reactor if more than one is in use) is between 7 and 100 MPa higher than the pressure in the separation vessel and the temperature in the separation vessel is above the crystallization temperature of the polymer or above 80° C. if the polymer has no crystallization temperature, whichever is higher;
(f) separating the monomer-rich phase from the polymer-rich phase;
(g) recycling the separated monomer-rich phase to one or more reactors of (a); and
(h) recovering polymer from the polymer-rich phase.

BRIEF DESCRIPTION OF THE DRAWINGS

FIG. 5 is a diagram of a polymerization process comprising a phase separator according to the invention.

DETAILED DESCRIPTION OF THE INVENTION

Figure 1:
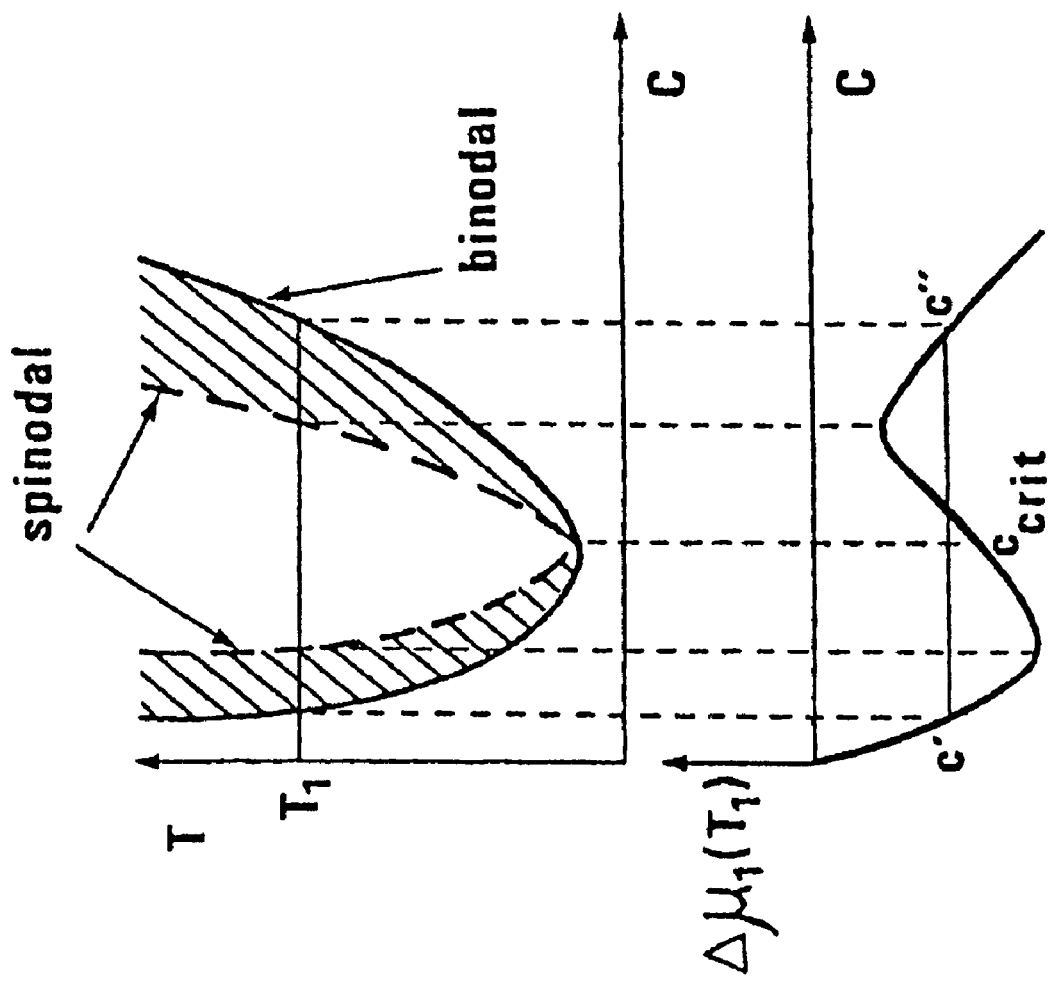
FIG. 1 presents a graphical depiction of the thermodynamic definition of binodal and spinodal boundaries.

For purposes of this invention and the claims thereto a catalyst system is defined to be the combination of one or more catalyst precursor compounds and one or more activators and any optional co-activators. Any part of the catalyst system can be optionally supported on solid particles, in which case the support is also part of the catalyst system.
Critical Properties of Pure Substances and Mixtures Pure substances, including all types of hydrocarbons, can exist in either a subcritical, or supercritical state, depending on their temperature and pressure. Substances in their supercritical state possess interesting physical and thermodynamic properties, which are exploited in this invention. Most notably, as supercritical fluids undergo large changes in pressure, their density and solvency for polymers changes over a wide range. To be in the supercritical state, a substance must have a temperature above its critical temperature (Tc) and a pressure above its critical pressure (Pc). Mixtures of hydrocarbons, including mixtures of monomers, polymers, and optionally solvents, have pseudo-critical temperatures (Tc) and pseudo-critical pressures (Pc), which for many systems can be approximated by mole-fraction-weighted averages of the corresponding critical properties (Tc or Pc) of the mixture's components. Mixtures with a temperature above their pseudo-critical temperature and a pressure above their pseudo-critical pressure will be said to be in a supercritical state or phase, and the thermodynamic behavior of supercritical mixtures will be analogous to supercritical pure substances. For purposes of this invention, the critical temperatures (Tc) and critical pressures (Pc) of certain pure substances relevant to the current invention are those that found in the Handbook of Chemistry and Physics, David R. Lide, Editor-in-Chief, 82nd edition 2001-2002, CRC Press, LLC. New York, 2001. In particular, the Tc and Pc of selected substances are:

| Name | Tc (K) | Pc (MPa) | Name | Tc (K) | Pc (MPa) |
|---|---|---|---|---|---|
| Hexane | 507.6 | 3.025 | Propane | 369.8 | 4.248 |
| Isobutane | 407.8 | 3.64 | Toluene | 591.8 | 4.11 |
| Ethane | 305.3 | 4.872 | Methane | 190.56 | 4.599 |
| Cyclobutane | 460.0 | 4.98 | Butane | 425.12 | 3.796 |
| Cyclopentane | 511.7 | 4.51 | Ethylene | 282.34 | 5.041 |
| 1-Butene | 419.5 | 4.02 | Propylene | 364.9 | 4.6 |
| 1-pentene | 464.8 | 3.56 | Cyclopentene | 506.5 | 4.8 |
| Pentane | 469.7 | 3.37 | Isopentane | 460.4 | 3.38 |
| Benzene | 562.05 | 4.895 | Cyclohexane | 553.8 | 4.08 |
| 1-hexene | 504.0 | 3.21 | Heptane | 540.2 | 2.74 |

273.2K=0° C.
Phase Behavior

The phase of a hydrocarbon, or mixture of hydrocarbons, such as the polymerization system, or the polymer-rich or monomer-rich phases forming from the polymerization system in the one or more separators of the disclosed processes, or any other mixtures comprising monomers and polymers, is a key thermodynamic property. A mixture's phase may be either solid, vapor, liquid, or a supercritical fluid. For purposes of this invention, the supercritical fluid phase may at times simply be referred to as the fluid phase. A mixture is determined to be in the supercritical fluid phase when its temperature exceeds its critical, or pseudo-critical temperature and when its pressure exceeds its critical, or pseudo-critical pressure.

Figure 2:
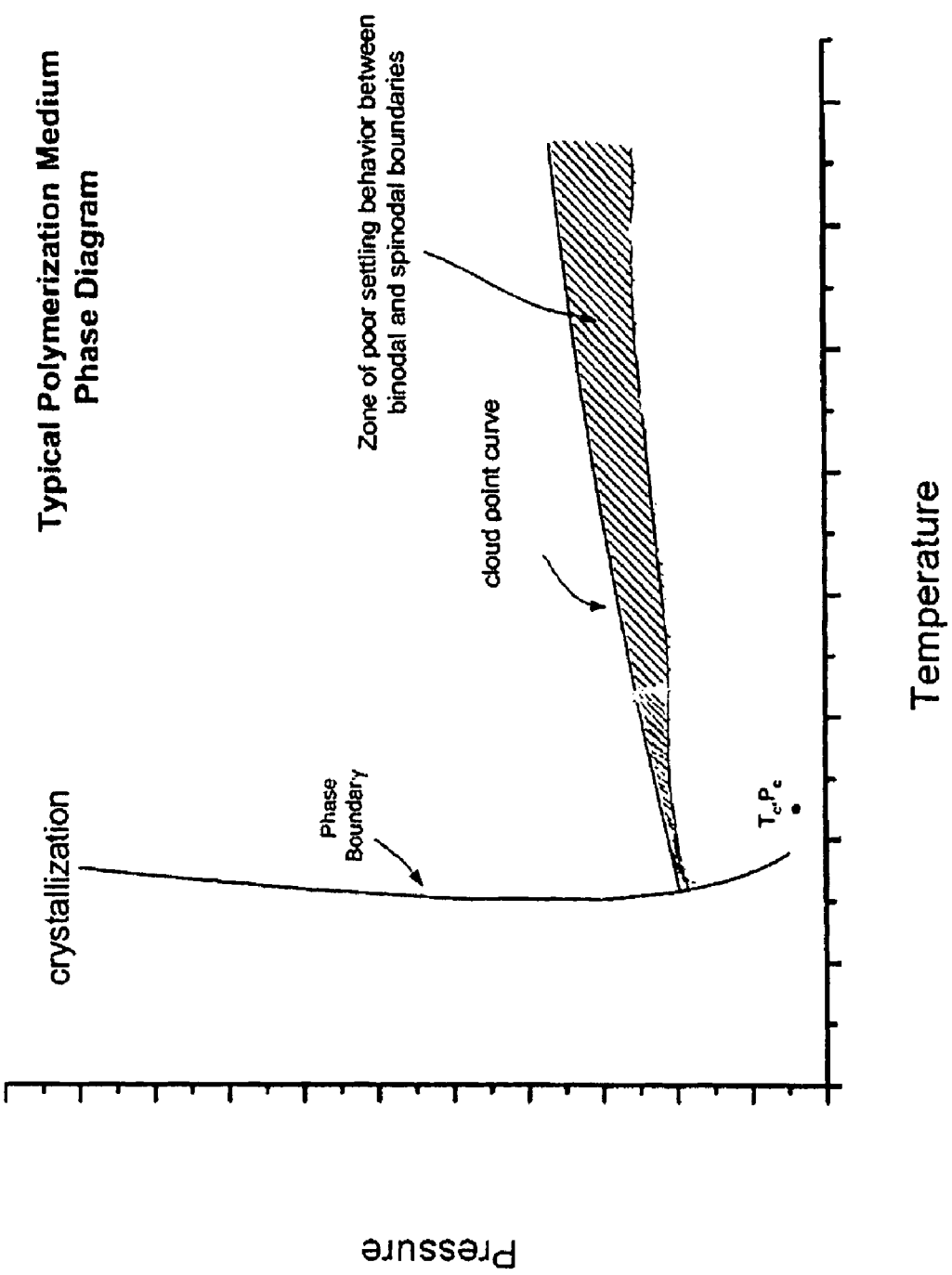
FIG. 2 presents a phase diagram for a typical polymerization medium of the current invention.
Figure 3:
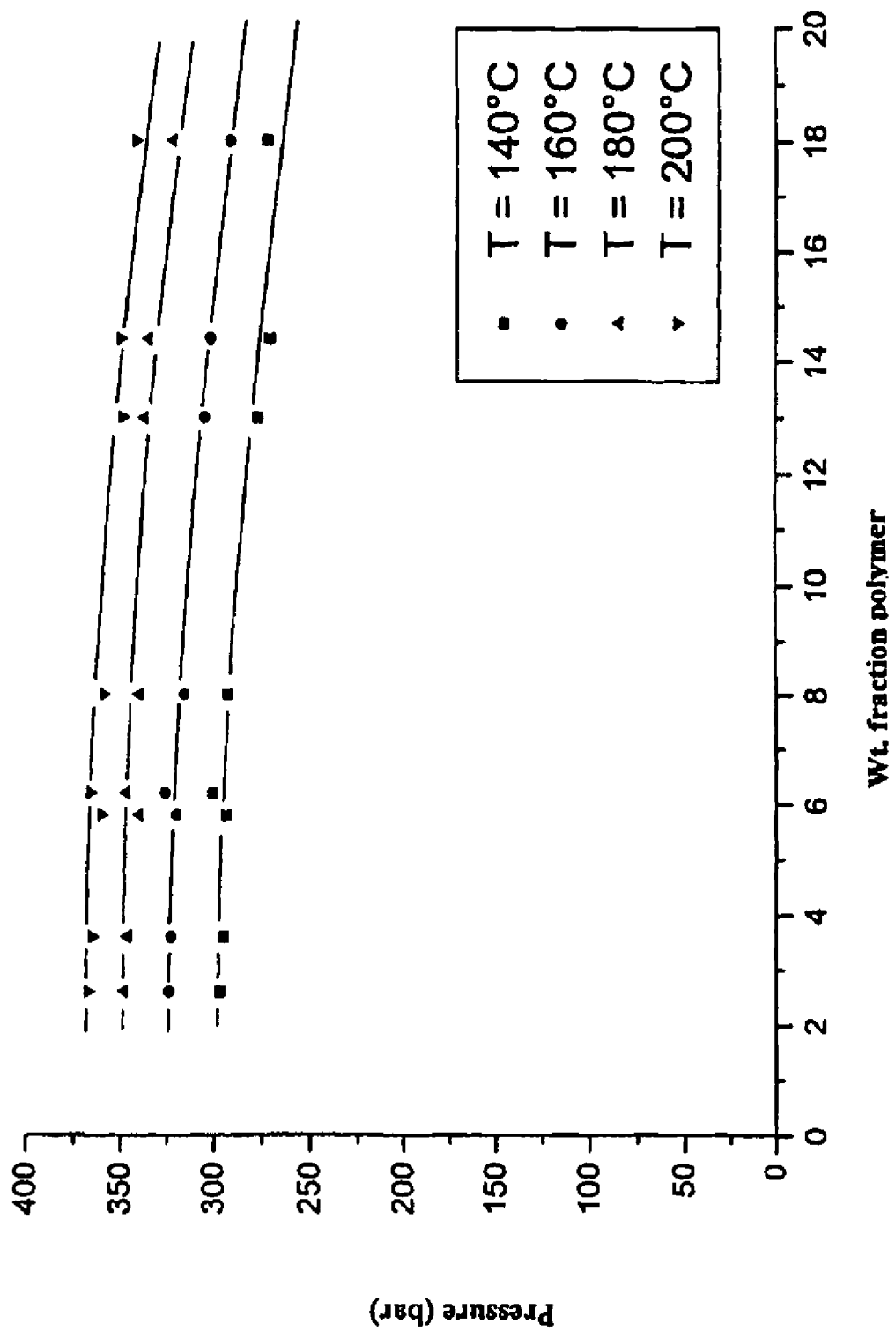
FIG. 3 presents cloud point isotherms for Polymer Achieve™ 1635. (Achieve 1635 is a commercially available metallocene-catalyzed isotactic polypropylene having a Melt Flow Index ($I_{10}/I_2$-ASTM 1238, 190° C., 2.16 kg) of 32 g/10 min available from ExxonMobil Chemical Company, Houston, Tex.)

When mixtures change their phase by virtue of changes in temperature, pressure, and/or composition, they are said to cross phase boundaries, which may be represented as a locus of points (curves) on temperature-pressure diagrams, where said curves apply to a mixtures of a given composition. For purposes of this invention, the phase boundaries between fluid and liquid phases will be called fluid-liquid phase boundaries and transitions of temperatures or pressures that cross these boundaries may be referred to as fluid-liquid transitions. For purposes of this invention, the phase boundaries between the single homogeneous fluid and two fluid (fluid-fluid) phases will be called cloud point curves. As a homogeneous single fluid (liquid or supercritical fluid) mixture crosses the cloud point, it is transformed into two phases of different densities and compositions. A given point on the cloud point curve will be referred to by its cloud point pressure. The cloud point pressure can be experimentally determined as the pressure at which, and below which, at a given temperature, the polymerization system becomes turbid as described in J. Vladimir Oliveira, C. Dariva and J. C. Pinto, Ind. Eng, Chem. Res. 29 (2000) 4627. For purposes of this invention and the claims thereto, the cloud point is measured by shining a laser through the selected polymerization system in a cloud point cell onto a photocell and recording the pressure at the onset of rapid increase in light scattering for a given temperature. For purposes of illustration, the cloud point curve of a typical polymerization medium is depicted in FIG. 2 (1 bar=100 kPa).

Phase boundaries between solids and fluids (i.e., between solids and liquids or between solids and supercritical fluids) will be called solid-fluid (or solid-liquid, when the fluid phase is a liquid) phase boundaries. Crossing solid-fluid (or solid-liquid) phase boundaries will be called solid-fluid (or solid-liquid) transitions. A single point on a solid-fluid (or solid-liquid) phase boundary may be referred to as solid-fluid (or solid-liquid) transition temperature. However, many of mixtures referred to in this disclosure exhibit two different solid-fluid (or solid-liquid) phase boundaries, depending on the direction of the phase change. One is for melting, ie. when the direction of phase change is from a solid or from a solid-fluid mixture to a fluid phase (one or more liquid or supercritical fluid phases) without solids, and the other is for crystallization, ie. when the direction of phase change is from a solids-free fluid (one or more liquid or supercritical fluid) phase to a phase comprising a solid phase. When it is necessary to differentiate between these two types of transitions, the terms melting and crystallization will be used, and a single point on the phase boundary will be referred to by its melting temperature or its crystallization temperature. For purposes of this invention and the claims thereto, solid-fluid (or solid-liquid) and fluid-solid (or liquid-solid) phase transitions are determined by shining a helium laser through the selected polymerization medium in a cell onto a photocell and recording the temperature (at a given pressure) at the onset of rapid increase in light scattering indicating the formation of a solid phase (crystallization), or at the onset of a rapid decrease in light scattering indicating the disappearance of a solid phase (melting). For purposes of illustration, solid-fluid (solid-supercritical fluid or solid-liquid) phase boundaries of both the crystallization and melting types for a typical polymerization medium are depicted in FIG. 2.

Phase Densities

As described above, the measurement of phase boundaries is determined by making multiple cloud point pressure measurements at a variety of temperatures for a given composition mixture, using the experimental methods described in J. Vladimir Oliveira, C. Dariva and J. C. Pinto, Ind. Eng, Chem. Res. 29 (2000) 4627. This phase boundary data is used to fit the Equation of State (EOS) models to predict the thermodynamic and physical properties of the individual phases, ie. fluid, liquid, solid, and/or vapor over a range of temperature and pressure. For the experimental work supporting the current invention, a version of the Statistically Associating Fluid Theory (SAFT) EOS called SAFT1 (H. Adidharma, M. Radosz, Ind. & Eng. Chem. Res. 37 (1998) 4453) has been used for this purpose. Because phase separation experiments are run at high temperatures and pressures, it is usually impractical to sample individual phases in multi-phase mixtures to determine their composition or physical properties, and thus the predicted properties of these phases have been used in lieu of directly measured values in support of the current invention. This approach has been validated in other instances, where material balances from pilot plants and commercial plants have been used to validate SAFT1 EOS predictions. As an example, SAFT1 EOS models of the polymerization systems and liquid-liquid separation systems described in U.S. Pat. Nos. 6,881,800 and 7,163,989, which include polymers, monomers, and catalysts somewhat similar to the current invention, but which include relatively large amounts of alkane solvents in the polymerization medium, and are operated at lower pressures than the current invention, have been verified by these types of material balances.

Spinodal Decomposition

Phase boundaries of mixtures, such as a polymerization medium, may be depicted as temperature-pressure (T,P) diagrams for a constant composition mixture as illustrated in FIG. 2, or alternatively, they may be depicted as T,c diagrams for mixtures at constant pressure (as illustrated conceptually by the binodal curve in FIG. 1) or P,c diagrams for mixtures at constant temperature, where the symbol c is used to denote composition. For multi-component mixtures the composition is designated by a series of composition variables $c_i$, where i refers to each component in the mixture, but for a binary mixture, a single variable c will adequately denote the composition. In general, the polymerization medium of the current invention is a multi-component mixture, but for our current purposes of illustration, there is no generality lost by considering the polymerization medium to be a binary mixture of polymer and a single low molecular weight hydrocarbon, and the composition variable c can be taken to denote polymer concentration. If we take, by way of example, a phase boundary depicted by T,c at constant P as depicted in FIG. 1, then the fluid-liquid phase boundary appears as a curve (which, following terminology commonly used in the art, we have designated as a binodal curve) where a minimum value of temperature (which is also commonly called the Lower Critical Solution Temperature, or LCST) exists at a concentration called the critical polymer concentration ($c_{crit}$). This binodal curve, which represents the two-phase (fluid-liquid) phase boundary, is a locus of points where the single phase polymerization medium is in equilibrium with a two-phase mixture of monomer-rich and polymer-rich phases. From FIG. 1, it is apparent that for any given temperature and pressure, which is represented by horizontal line at $T_1$, there are two mixture compositions that are in equilibrium with the polymerization medium, and thus in equilibrium with each other. One of these mixture compositions is a monomer-rich composition, and the other a polymer-rich composition (these two compositions are designated as c' and c" on FIG. 1). The bottom part of FIG. 1 illustrates a curve representing the chemical potential ($\Delta\mu_1$) of the binary mixture as a function of c at a temperature equal to $T_1$ (note that a similar curve could be constructed for all other values of T). Note also that $\Delta\mu_1(c')=\Delta\mu_1(c'')$, since for two mixtures to be in equilibrium, their chemical potentials must be equal. At other values of c on this curve, $\Delta\mu_1$ assumes other values, since these other compositions are not in equilibrium with c' and c''. Along this $\Delta\mu_1$ curve, there are two other special points, where the first partial derivative of $\Delta\mu_1$ with respect to composition is zero ($\partial\Delta\mu_1/\partial c=0$). This is the thermodynamic criterium that defines the spinodal boundary, as is illustrated by the graphical construction in FIG. 1. For compositions on, or inside, the spinodal boundary, the compositions of the monomer-rich and polymer-rich phases differ sufficiently from equilibrium to form a thermodynamically unstable two-phase mixture, which tends to form a co-continuous morphology rather than a morphology where one of the two phases is dispersed as droplets in a continuum of the other phase. Inside the cross-hatched area in FIG. 1, the mixture tends to form a morphology where one of the two phases is dispersed in a continuum of the other phase. When the polymer concentration in the polymerization medium is higher than $c_{crit}$, the polymer-rich phase is continuous, and when the polymer concentration in the polymerization medium is lower than $c_{crit}$, the monomer-rich phase is continuous. In many embodiments of the current invention, the polymerization medium is a single phase fluid, such that its thermodynamic state (T,P,c) would place it in the single phase region outside the binodal boundary on FIG. 1. The process of spinodal decomposition refers to a process by which a rapid change in the temperature or pressure is effected to move the thermodynamic state of the system across both the binodal and spinodal boundaries to a point inside the spinodal boundary. For this change to be effective in producing the desired co-continuous morphology, the time that the thermodynamic state of the system resides in the area between the binodal and spinodal boundaries (cross-hatched area of FIG. 1) is short enough that the undesired morphology does not have sufficient time to become established. The exact value of time that satisfies this criterium must be determined empirically for each polymerization medium. Spinodal boundaries may also be depicted on phase diagrams which plot pressure vs. temperature at constant composition, as illustrated in FIG. 2. A full treatment of this concept may be found in the paper "A Low-Energy Solvent Separation Method", T. G. Gutowski et. al., Polymer Engineering and Science, March 1983, v. 23, No. 4.

Figure 4:
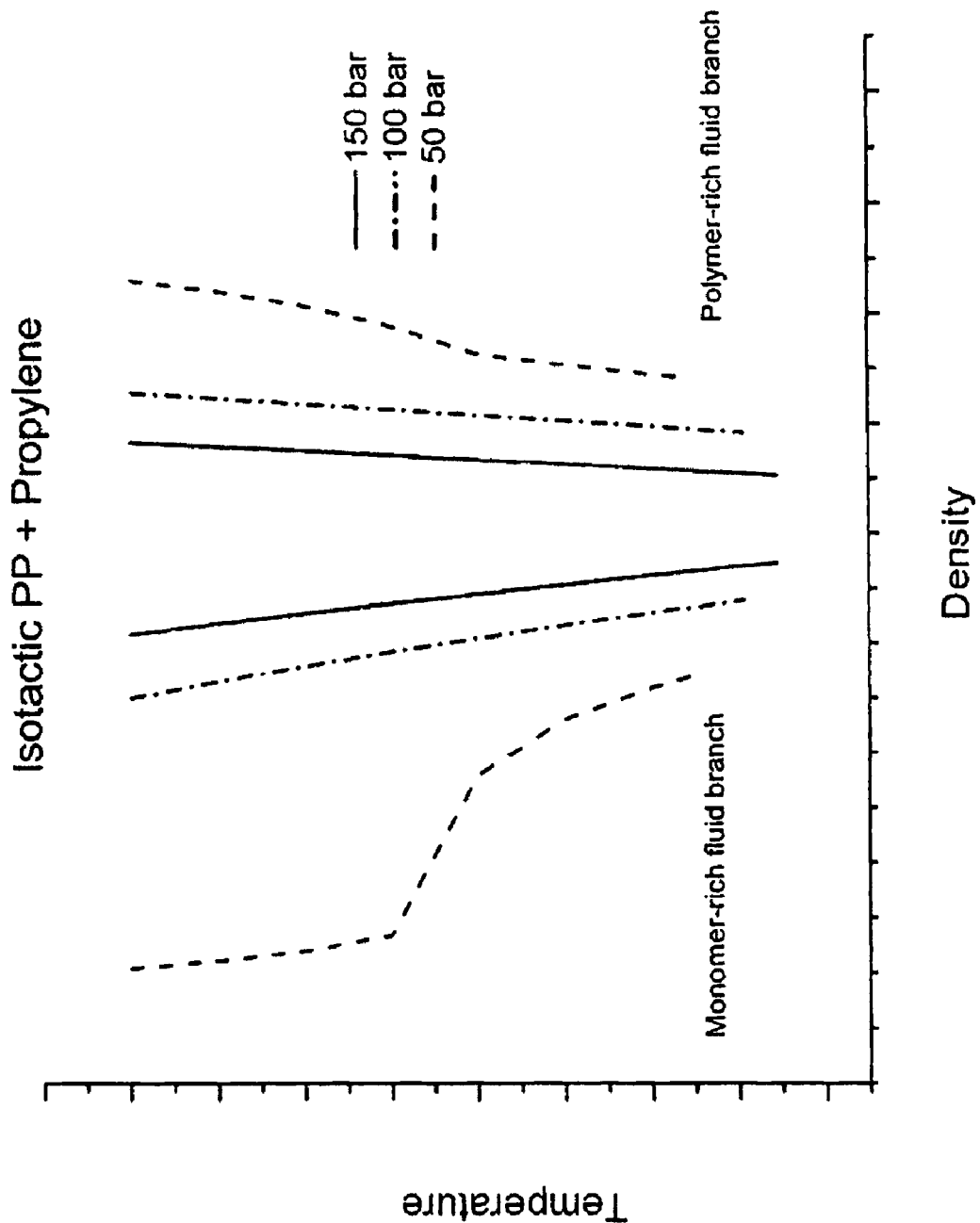
FIG. 4 shows the density of monomer-rich and polymer-rich phases formed from a mixture of isotactic polypropylene (isotactic PP) polymer and propylene monomer.

The term "monomer-rich phase" or "monomer-rich stream" are defined to mean a phase or stream that concentrate the monomers present in a stream or equipment upstream in the process. The monomer-rich phase in the phase separator of the present disclosure, for example, concentrates the monomers that were present in the reactor or in its effluent. The monomer-rich stream leaving the phase separator of the present disclosure, contains the monomers in a higher concentration than they are present in the reactor effluent. Specifically the monomer rich stream has at least 10% more unreacted monomer present as compared to the concentration of the monomers present in the effluent at the exit of the reactor, preferably at least 20% more, preferably at least 30% more, preferably ate last 40% more, preferably at least 50% more. Analogously, the term "polymer-rich phase or "polymer-rich stream" are defined to mean a phase or stream that concentrates the polymer present in a stream or equipment upstream in the process. The polymer-rich phase in the phase separator of the present disclosure, for example, concentrates the monomers that were present in the reactor or in the reactor effluent. The monomer-rich stream leaving the phase separator of the present disclosure contains the monomers in a higher concentration than they are present in its effluent. Specifically the polymer rich stream has at least 10% more polymer present as compared to the concentration of the polymer present in the effluent at the exit of the reactor, preferably at least 20% more, preferably at least 30% more, preferably ate last 40% more, preferably at least 50% more. FIG. 4 of this disclosure further illustrates the meaning of monomer-rich and polymer-rich phases and streams.

Polymerization Systems

A higher α-olefin or higher alpha-olefin is defined as an alpha-olefin having four or more carbon atoms.

Polymerization is defined to include any polymerization reaction such as homopolymerization and copolymerization.

Copolymerization is defined to include any polymerization reaction of two or more monomers.

When a polymer is referred to as comprising an olefin, the olefin present in the polymer is the polymerized form of the olefin.

A catalyst system is defined to be the combination of one or more catalyst precursor compounds (also called catalysts or catalyst compounds) and one or more activators. Any part of the catalyst system can be optionally supported on solid particles, in which case the support is also part of the catalyst system.

A polymerization system is defined to be a reaction system comprising monomer(s) plus comonomer(s) plus polymer(s) plus optional inert solvent(s)/diluent(s) plus optional scavenger(s). Note that for the sake of convenience and clarity, the catalyst system is always addressed separately in the present discussion from other components present in the reaction system. In this regard, the polymerization system is defined here narrower than customary in the art of polymerization that typically considers the catalyst system as part of the polymerization system. In the current definition, the mixture present in the polymerization reactor and in its effluent is composed of the polymerization system plus the catalyst system.

A polymerization medium is defined to be the effluent mixture from the polymerization system, including unreacted monomer(s) plus comonomer(s) plus polymer(s) plus optional inert solvent(s)/diluent(s) plus catalyst residues plus optional scavenger(s). Unless expressly stated otherwise, the temperature and pressure of the polymerization medium will assumed to be equal to the temperature and pressure of the polymerization system.

The terms solvent and diluent are used interchangeably for purposes of this invention, and are defined to be an inert component in the polymerization system, ie. a component which does not undergo reaction in the polymerization system.

The term fluid describes materials in their liquid or supercritical state.

Dense fluids are defined as fluid media in their liquid or supercritical state with densities greater than 300 kg/m$^3$.

A homogeneous polymerization system contains all of its components dispersed and mixed on a molecular scale. In our discussions, homogeneous polymerization systems are in a single dense phase, ie. either in a liquid or (supercritical) fluid phase. Note that our definition of the polymerization system does not include the catalyst system, thus the catalyst system may or may not be homogeneously dissolved in the polymerization system. A homogeneous system may have regions with concentration gradients, but there would be no sudden, discontinuous changes of composition on a micrometer scale within the system. A polymerization system is not homogeneous when it is partitioned to more than one phase, but rather is said to be a heterogeneous system.

The following abbreviations are defined: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is tri-isobutylaluminum, MAO is methylaluminoxane, pMe is para-methyl, flu is fluorenyl, cp is cyclopentadienyl.

By continuous is meant a system that operates without interruption or cessation. For example, a continuous process to produce a polymer would be one where the reactants are continually introduced into one or more reactors and polymer product is continually withdrawn.

Slurry polymerization refers to a polymerization process in which a solid polymer phase (e.g., granular) forms in a polymerization medium that includes at least one additional phase. The additional phases in the polymerization medium may comprise a vapor, a liquid, a (supercritical) fluid, liquid/liquid, or fluid/liquid, phase(s). If the polymerization medium consists of vapor and liquid phases, the polymer resides in the liquid phase.

Solution polymerization refers to a polymerization process in which the polymer is dissolved in a liquid or (supercritical) fluid polymerization medium, where the polymerization medium may include unreacted monomer(s), one or more inert solvents, or their blends. Solution polymerization comprises a homogeneous polymerization system.

Supercritical polymerization refers to a polymerization process in which the polymerization medium is in a supercritical fluid phase.

Bulk polymerization refers to a polymerization process in which the fluid polymerization system contains less than 40 wt % of inert solvent or diluent. Preferably the bulk polymerization contains less than 30 wt %, or less than 20 wt %, or less than 10 wt %, or less than 5 wt %, or less than 1 wt % of inert solvent or diluent. The product polymer may be dissolved in the polymerization medium or may be in the form a separate solid phase, as with slurry polymerization. In this terminology, a slurry polymerization medium in which solid polymer particulates form in a liquid or fluid polymerization medium containing less than 40 wt % of inert solvent or diluent, will be referred to as a bulk slurry polymerization process or bulk heterogeneous dissolved in a liquid or fluid phase polymerization medium containing less than 40 wt polymerization process. The polymerization process in which the polymeric product is % of inert solvent or diluent will be referred to as a bulk homogeneous polymerization process. The polymerization process in which the polymeric product is dissolved in a liquid or fluid phase polymerization medium containing less than 40 wt % (preferably less than 30 wt %, or less than 20 wt %, or less than 10 wt %, or less than 5 wt %, or less than 1 wt %) of inert solvent or diluent will be referred to as bulk solution polymerization process. The polymerization process in which the polymeric product is dissolved in a (supercritical) fluid polymerization medium containing less than 40 wt % (preferably less than 30 wt %, or less than 20 wt %, or less than 10 wt %, or less than 5 wt %, or less than 1 wt %) of inert solvent or diluent will be referred to as bulk homogeneous supercritical polymerization process.

Homogeneous supercritical polymerization should be distinguished from heterogeneous supercritical polymerizations, such as for example, supercritical slurry processes, the latter of which are performed in a supercritical fluid phase, but form a second phase consisting of solid polymer particulates in the polymerization medium. Similarly, bulk homogeneous supercritical polymerization should be distinguished from bulk solution polymerization, the latter of which is performed in a liquid as opposed to in a (supercritical) fluid polymerization medium.

Crystallization temperature and melting temperature of the polymer are measured using Differential Scanning Calorimetry (DSC) using a TA Instruments 2920 DSC. 10 mg of molded polymer or plasticized polymer is sealed in an aluminum pan and loaded into the instrument at room temperature. Melting data (first heat) is acquired by heating the sample to at least 30° C. above its melting temperature, typically 220° C. for polypropylene, at a heating rate of 10° C./min. The sample is held for at least 5 minutes at this temperature to destroy its thermal history. Crystallization data are acquired by cooling the sample from the melt to at least 50° C. below the crystallization temperature, typically −50° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed for onset of transition and peak temperature. The melting temperatures reported are the peak melting temperatures from the second heat unless otherwise specified. For polymers displaying multiple peaks, the melting point (or melting temperature) is defined to be the peak melting temperature (i.e., associated with the largest endothermic calorimetric response in that range of temperatures) from the DSC melting trace; likewise, the crystallization temperature is defined to be the peak crystallization temperature (i.e., associated with the largest exothermic calorimetric response in that range of temperatures) from the DSC crystallization trace. Areas under the DSC curve are used to determine the heat of transition (heat of fusion, $H_f$, upon melting or heat of crystallization, $H_c$, upon crystallization).

This invention relates to a process for the economical separation and recovery of the polymer from the lower molecular weight components of the reaction medium for a polymerization system, preferably the polymerization system described in WO2004/026921. The polymerization process described in WO2004/026921 includes the steps of contacting, in a polymerization system, olefin monomers having three or more carbon atoms, and optionally a wide range of olefinic and/or diolefinic comonomers, with one or more metallocene catalyst compounds, one or more activators, and an optional inert diluent or solvent, at a temperature above the solid-fluid transition temperature of the polymerization system, and at a pressure no lower than 10 MPa below the cloud point pressure of the polymerization system and less than 200 MPa. The effluent from the polymerization reactors, i.e. the polymerization medium, contains the unreacted monomer and optional comonomers, any diluent or solvent present, and the polymer product. In the current invention, the polymerization medium leaving the aforementioned polymerization process is directed to a pressure letdown device, optionally with preheating. The pressure letdown device is located at the inlet of a fluid-liquid phase separation vessel. The pressure letdown device rapidly reduces the pressure of the polymerization medium to a pressure below the cloud point pressure to form a two-phase mixture comprising a polymer-rich phase and a monomer-rich phase. Preferably the temperature of the polymerization medium is above the crystallization temperature of the polymer in the polymerization medium. The monomer-rich phase and polymer-rich phases are separated within the fluid-liquid phase separation vessel by gravity settling, and the separated monomer-rich phase is recycled to the polymerization system with minimal processing.

The monomer rich and polymer rich phases in the polymerization medium after is has been letdown, (preferably to a pressure below the cloud point pressure and a temperature above the crystallization temperature of the polymer (advantageously, at least 10° C. above the crystallization temperature, or at least 20° C. above the crystallization temperature, or at least 50° C. above the crystallization temperature, or if the polymer has no crystallization temperature above 80° C., preferably above 90° C., preferably above 100° C.) typically have significantly different densities. The difference between the two densities is typically 0.2 g/mL or more, alternatively 0.3 g/mL or more, or 0.4 g/mL or more, or 0.5 g/mL or more, or 0.6 units or more. In a useful embodiment, the polymer is kept in solution or molten state until after exiting the phase separation vessel. In a preferred embodient, the pressure in the reactor (or in at least one reactor if more than one reactor is in use) is between 7 and 100 MPa higher than the pressure in the separation vessel (such as the high pressure separator), preferably 15 and 75 MPa and 25 and 50 MPa.

In one embodiment of the process, the polymerization system, which preferably includes no inert solvent, produces a propylene-rich polymer at a temperature above the crystallization temperature of the polymerization medium, and at a pressure above the cloud point pressure of the polymerization medium. This single-phase polymerization medium is directed without further heating to the pressure reducing device, which may be a letdown valve. The pressure reducing device rapidly reduces the pressure of the polymerization medium, typically at a rate of 2 MPa/sec or more (preferably 6 MPa/sec or higher), to a pressure below the cloud point pressure of the polymerization medium (and typically also below the pressure at the spinodal boundary), to form a two-phase mixture comprising a polymer-rich phase and a monomer-rich phase. As a direct result of the rapid rate of pressure letdown, the monomer-rich phase and polymer-rich phases are easily separated within the fluid-liquid phase separation vessel by gravity settling, and the separated monomer-rich phase is recycled to the polymerization system with minimal processing, which may optionally include cooling of the stream, removal of some hydrogen from the stream, removal of any low molecular weight polymer that precipitates, and/or drying of the stream over a desiccant bed. The polymer-rich phase is directed to a devolatization system for the removal of any remaining unreacted monomers or other volatile components.

In particular, the processes disclosed herein provide an effective pathway for separation of polymer from the low molecular weight components of the polymerization medium and recycle of the low molecular weight components in a monomer-rich recycle stream for embodiments where the polymerization process is a bulk homogeneous supercritical polymerization process (such as in the polymerization process of WO2004/026921), and in which the polymer product has propylene as its principal monomer with optional comonomers, an example of which is supercritical polypropylene polymerization (SCPP). As will be discussed in more detail below, the efficient separation of monomer and polymer is achieved by advantageously utilizing the cloud point and solid-fluid phase relationships for the relevant olefin or olefinic mixture; e.g. polypropylene-propylene, poly(propylene-ethylene)-propylene-ethylene, etc. mixtures.

In a preferred embodiment, this invention relates to a process for separating the polymerization medium derived from any of the polymerization systems described in the invention WO2004/026921 into a monomer-rich phase and a polymer-rich phase, and for the subsequent recovery of the polymer in a devolatization process, and for the recycle of the monomer-rich phase in an economical and efficient manner back to the polymerization process with minimal processing, thereby achieving the lowest practical investment and operating costs for a commercial implementation of the aforementioned polymerization process. The polymerization medium derived from this polymerization process is in a supercritical fluid state, and may consist of a single super-critical fluid phase, or a two phase fluid-fluid or fluid-liquid mixture. The low molecular weight components of the polymerization medium may contain only the unreacted monomers of the polymerization, or may optionally include an inert solvent at a concentration of up to 40 wt %, and the polymer component of the polymerization medium may contain either a single polymer or a blend of two or more polymers (such as those disclosed in WO2004/20691). The process preferably consists of a series of sequential steps: (a) Reduction of the pressure of the polymerization medium via a pressure reducing device to a pressure below the cloud point pressure, but high enough to avoid full or partial vaporization of the monomer-rich phase, resulting in the formation of a two phase mixture—a lower density monomer-rich phase, and a higher density polymer-rich phase; (b) Transfer of the two phase fluid-fluid or fluid-liquid mixture leaving the pressure reducing device into a gravity settling device designed with sufficient size to provide sufficient (typically more than one minute, preferably between 1 and 30 minutes) residence time, more preferably between 1 and 15 minutes, to disengage and settle the two phases into a top layer (monomer-rich phase) and a bottom layer (polymer-rich phase); (c) Transfer of the polymer-rich phase to a cascade of flash vessels with ever-decreasing pressure to progressively remove remaining monomers and solvent from the polymer-rich phase. These vessels may be operated adiabatically, or one of more of them may heat the polymer solution with a heating medium to reduce the residual volatiles content of the polymer; (d) Recycle of the monomer-rich phase directly to the polymerization feed system without further processing. This series of steps encompasses all versions of the WO2004/02691 polymerization process, and includes only the minimum number of steps required to recover polymer and recycle the monomer-rich phase. These steps can be modified by 1) adding optional steps, 2) restricting operating conditions to optimal ranges, and 3) restricting the composition of the polymerization medium itself. Each of these is discussed below:

Addition of Optional Process Steps

A heating step (see section below), which may include exchange of heat with the monomer-rich phase (i.e. heat integration—see below), to raise the temperature of the polymerization medium to high enough to prevent a solid-fluid phase separation from taking place upstream of, or inside, the fluid-liquid phase separation vessel (also called a high pressure separator or HPS), and also high enough such that when the pressure is reduced across the pressure reducing device (letdown valve), that there exists a pressure where an efficient separation of the polymerization medium into a monomer-rich phase and a polymer-rich phase can occur at a high enough pressure to prevent full or partial vaporization of the monomer-rich phase.

A catalyst killing step as discussed below. This would include the optional use of desiccant drying of the monomer-rich phase recycle stream.

A hydrogen removal step, as discussed below, i.e. may comprise, but is not restricted to, single or multiple stage flash vessels, fractionation towers, or hydrogenation beds. Treatment for removal of hydrogen may be applied to the entire monomer-rich recycle stream, or in instances where the hydrogen removal requirements permit, to only a portion, or slip-stream of the monomer-rich recycle stream.

Cooling of the monomer-rich phase to a temperature for cases where the monomer-rich phase temperature exceeds that of the polymerization system feed. This may be combined with knockout pots or filtration to remove polymer that precipitates from the monomer-rich phase upon cooling. See section below for more details on this.

Restriction of Operating Conditions

Phase separation temperature could be modified, particularly for systems where optional heating is employed, so a temperature restriction would be combined with the heating step addition above. The strategy for narrowing the temperature range when employing a heater is outlined below.

Phase separation pressure could be modified based on the principal of defining an optimal range between the highest possible pressure (cloud) point pressure, and the lowest possible pressure (pressure where full or partial vaporization of the monomer-rich phase occurs). The first modification would replace the cloud point pressure with the spinodal boundary pressure, and then subsequent modifications could narrow the range by setting maximums progressively lower than the spinodal boundary, and minimums progressively higher than the vapor pressure (full or partial vaporization of the monomer-rich phase). These concepts are illustrated in below. A benefit of optimizing pressure is to minimize the total cost of product recovery and monomer-rich phase recycle systems. Higher pressures raise the cost of product recovery (more monomer to flash off), but lower the cost of monomer-rich phase recycle—less pumping, cooling cost.

The use of spinodal decomposition for enhancing phase separation involves setting modifications on both the separation pressure (as described above) and the rate of pressure reduction by the pressure reducing device, as outlined below. The benefit of spinodal decomposition is faster disengagement of the two phases downstream of the pressure reducing device, and thus savings in the investment cost of the HPS vessel. The difference in density of the monomer-rich and polymer-rich phases is discussed in section below, as it relates to the separation pressure. A range of phase density difference could selected with the claimed benefit being faster settling and savings in the investment cost of the HPS vessel.

Restriction of Composition of Polymerization Medium

The polymerization medium could be modified around inert solvent content. However, preferably there is no solvent, i.e. where the polymer is in solution in a mixture of unreacted monomers.

The polymerization medium could be further modified around polymer type, where the desired polymer is propylene-rich polymer, where propylene is the principal monomer (i.e. greater than 50 mole %). In a preferred embodiment, low density (0.915 g/cm$^3$ or less) polymers that cannot be made in bulk liquid slurry processes are produced herein.

The polymerization medium could be further modified to a thermodynamic state of a single phase supercritical fluid. Combining these three modifications gives you the a particularly preferred embodiment associated with SCPP, which could be combined with modifications on phase separation temperature and pressure to give very precise control.

Catalyst Systems

The processes described herein may use any polymerization catalysts (also called a catalyst system (i.e. a catalyst compound (also referred to as a catalyst precursor) and an activator with optional co-activator and/or scavenger)) capable of polymerizing the monomers disclosed herein if that catalyst system is sufficiently active under the polymerization conditions disclosed herein. Thus, Group-3-10 transition metals may form suitable polymerization catalysts. A suitable olefin polymerization catalyst compound will be able to coordinate to, or otherwise associate with, an alkenyl unsaturation. Exemplary, but not limiting, olefin polymerization catalyst compounds include Ziegler Natta catalyst compounds, metallocene catalyst compounds, and other non-metallocene catalyst compounds. Exemplary but non limiting activators include alumoxanes, such as methylalumoxane and ionizing activators such as non-coordinating anions. Useful non-coordinating anions include trimethylammonium tetrakis(pentafluorophenyl)borate, N,N-dimethylanilinium tetrakis (pentafluorophenyl)borate, triphenylcarbenium tetra(perfluorophenyl)borate, and N,N-dimethylanilinium tetra (perfluorophenyl)borate. Useful alumoxanes can be obtained from commercial sources, for example, Akzo-Nobel Corporation, and include methylalumoxane, MMAO-3A, MMAO-12, and PMAO-IP. Combinations of alumoxanes, combinations of non-coordinating anion activators, and combinations of alumoxanes and non-coordinating anion activators can be used in the practice of this invention.

When utilizing supercritical polymerization conditions, homogenous polymerization catalysts, such as metallocene based catalysts and other single site homogenous catalyst compounds may be advantageous. For example, when polymerizing propylene under supercritical conditions, particularly useful metallocene catalyst and non-metallocene catalyst compounds are those disclosed in U.S. Ser. No. 10/667, 585 and US 2006-0293474 which are herein incorporated by reference.

Preferred catalyst and activator compounds and combinations thereof useful herein are listed at pages 21 to page 85 of WO 2004/026921. Particularly preferred catalyst compounds useful herein are listed at page 29, paragraph [0101] to page 66, line 4 of WO 2004/026921. Preferred activator compounds useful herein include those listed at paragraph [00135] pages 77-78 of WO 2004/026921. Another group of catalyst compounds and activators (e.g. catalyst systems comprising one or more activators and one or more nonmetallocene metal-centered, heteroaryl ligand catalyst compounds, where the metal is chosen from the Group 4, 5, 6, the lanthanide series, or the actinide series of the Periodic Table of the Elements) useful herein are disclosed in Ser. No. 11/714,546, filed Mar. 6, 2007. Such catalyst compounds are also described in more detail in WO03/040095, WO 03/040201; WO 03/040202; WO 03/040233; WO 03/040442; and U.S. Pat. No. 7,087,690.

Further catalyst compounds and systems useful herein include those disclosed in: U.S. Pat. Nos. 6,897,276; 7,091, 292; WO 2006/066126; Nonconventional catalysts for isotactic propene polymerization in solution developed by using high-throughput-screening technologies, Boussie, Thomas R.; et al. Angewandte Chemie, International Edition (2006), 45(20), 3278-3283.

Particularly useful catalysts include: rac-dimethylsilylbis-(5,6,7,8-tetrahydro-5,5,8,8-tetramethyl-2-methyl-1H-benz(f)indene)haffiium dimethyl; dimethylsilyl(tetramethylcyclopentadienyl)(dodecylamido)titanium dimethyl; 1,1'-bis (4-triethylsilylphenyl)methylene-(cyclopentadienyl)(2,7-ditertiary-butyl-9-fluorenyl)hafniium dimethyl; dimethylsilylbis(indenyl)hafnium dimethyl; dimethylsilylbis (tetrahydroindenyl)zirconium dichloride; dimethylsilyl bis (2-methylindenyl) zirconium dichloride; dimethylsilyl bis(2-methylfluorenyl)zirconium dichloride; dimethylsilyl bis(2-methyl-5,7-propylindenyl)zirconium dichloride; dimethylsilyl bis(2-methyl-5-phenylindenyl)zirconium dichloride; dimethylsilyl bis(2-ethyl-5-phenylindenyl) zirconium dichloride; dimethylsilyl bis(2-methyl-4-phenylindenyl) zirconium dichloride; and diphenylmethylene(cyclopentadienyl)(fluoroenyl) haffiium dimethyl. Useful catalyst also include the dialkyl (such as dimethyl) analog of any of the dihalide catalysts named above.

Particularly useful metallocene compounds include $Me_2Si$-bis(2-R, 4-Phl-indenyl)$MX_2$, where R is an alkyl group (such as methyl), Phl is phenyl or substituted phenyl, M is Hf, Zr or Ti, and X is a halogen or alkyl group (such as Cl or methyl). Particularly useful metallocene compounds include: dimethylsilyl-bis(2-methyl, 4-phenyl-indenyl)zirconium dimethyl (or dichloride), dimethylsilyl-bis(2-methyl, 4-(3',5'-di-t-butyl-phenyl)-indenyl)zirconium dimethyl (or dichloride), dimethylsilyl-bis(2-methyl, 4-naphthyl-indenyl) zirconium dimethyl (or dichloride), and dimethylsilyl-bis(2-methyl, 4-(3',5'-di-t-butyl-naphthyl)-indenyl)zirconium dimethyl (or dichloride).

In a preferred embodiment, the catalyst system used herein comprises an activator (preferably a non coordinating anion such as trimethylammonium tetrakis(pentafluorophenyl)borate, N,N-dimethylanilinium tetrakis(pentafluorophenyl) borate, triphenylcarbenium tetra(perfluorophenyl)borate, or N,N-dimethylanilinium tetra(perfluorophenyl)borate) and a catalyst compound represented by the formula:

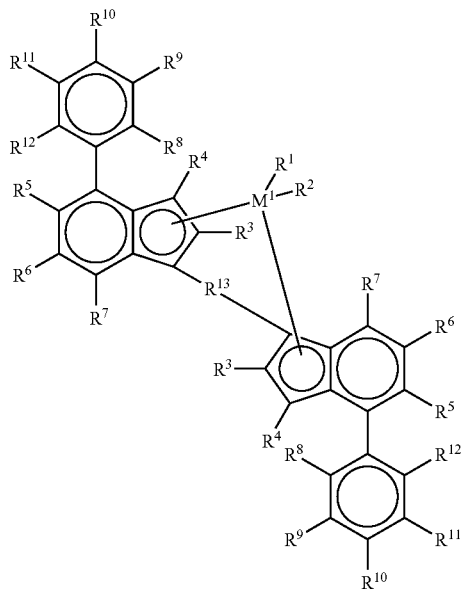

where $M^1$ is selected from titanium, zirconium, hafnium, vanadium, niobium, tantalum, chromium, molybdenum, or tungsten (preferably zirconium and or hafnium);

$R^1$ and $R^2$ are identical or different and are selected from hydrogen atoms, $C_1$-$C_{10}$ alkyl groups, $C_1$-$C_{10}$ alkoxy groups, $C_6$-$C_{10}$ aryl groups, $C_6$-$C_{10}$ aryloxy groups, $C_2$-$C_{10}$ alkenyl groups, $C_2$-$C_{40}$ alkenyl groups, $C_7$-$C_{40}$ arylalkyl groups, $C_7$-$C_{40}$ alkylaryl groups, $C_8$-$C_{40}$ arylalkenyl groups, OH groups or halogen atoms; or conjugated dienes that are optionally substituted with one or more hydrocarbyl, tri(hydrocarbyl)silyl groups or hydrocarbyl tri(hydrocarbyl)silylhydrocarbyl groups (preferably $R^1$ and $R^2$ are an alkyl such as methyl or ethyl or are a halide such as chloride);

$R^3$-$R^{12}$ are the same or different and are selected from hydrogen atoms, halogen atoms, $C_1$-$C_{10}$ halogenated or unhalogenated alkyl groups, $C_6$-$C_{10}$ halogenated or unhalogenated aryl groups, $C_2$-$C_{10}$ halogenated or unhalogenated alkenyl groups, $C_7$-$C_{40}$ halogenated or unhalogenated arylalkyl groups, $C_7$-$C_{40}$ halogenated or unhalogenated alkylaryl groups, $C_8$-$C_{40}$ halogenated or unhalogenated arylalkenyl groups, $-NR'_2$, $-SR'$, $-OR'$, $-OSiR'_3$ or $-PR'_2$ radicals in which R' is one of a halogen atom, a $C_1$-$C_{10}$ alkyl group, or a $C_6$-$C_{10}$ aryl group; or two or more adjacent radicals R to $R^7$ together with the atoms connecting them can form one or more rings (preferably $R^3$ is methyl, ethyl or butyl), and adjacent radicals $R^{11}$ and $R^{12}$ can form one or more saturated or aromatic rings (preferably $R^{11}$ and $R^{12}$ combine with the phenyl ring to form a substituted or unsubstituted naphthyl group);

$R^{13}$ is selected from:

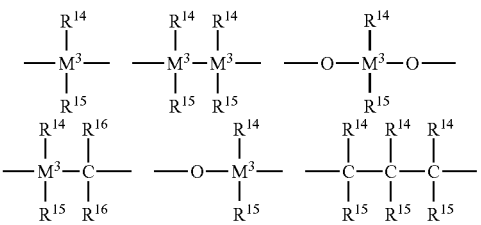

$-B(R^{14})-$, $-Al(R^{14})-$, $-Ge-$, $-Sn-$, $-O-$, $-S-$, $-SO-$, $-SO_2-$, $-N(R^{14})-$, $-CO-$, $-P(R^{14})-$, $-P(O)-(R^{14})-$, $-B(NR^{14}R^{15})-$ and $-B[N(SiR^{14}R^{15}R^{16})_2]-$, $R^{14}$, $R^{15}$ and $R^{16}$ are each independently selected from hydrogen, halogen, $C_1$-$C_{20}$ alkyl groups, $C_6$-$C_{30}$ aryl groups, $C_1$-$C_{20}$ alkoxy groups, $C_2$-$C_{20}$ alkenyl groups, $C_7$-$C_{40}$ arylalkyl groups, $C_8$-$C_{40}$ arylalkenyl groups and $C_7$-$C_{40}$ alkylaryl groups, or $R^{14}$ and $R^{15}$, together with the atom(s) connecting them, form a ring; and $M^3$ is selected from carbon, silicon, germanium and tin, or $R^{13}$ is represented by the formula:

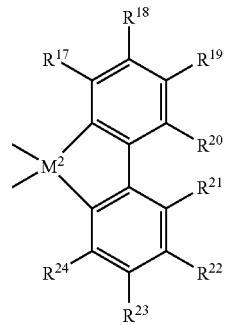

wherein $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; $M^2$ is carbon, silicon, germanium, or tin (preferably $R^{13}$ is dimethyl silyl or diphenylsilyl).

The molar ratio of catalyst/activator employed preferably ranges from 1:10,000 to 100:1, more preferably from 1:5000 to 10:1, most preferably from 1:100 to 1:1. In one embodiment the cocatalyst can be used in combination with a tri (hydrocarbyl)aluminum compound having from 1 to 10 carbons in each hydrocarbyl group. Mixtures of activating cocatalysts may also be employed. It is possible to employ these aluminum compounds for their beneficial ability to scavenge impurities such as oxygen, water, and aldehydes from the polymerization mixture. Preferred aluminum compounds include trialkyl aluminum compounds having from 1 to 6 carbons in each alkyl group, especially those wherein the alkyl groups are methyl, ethyl, propyl, isopropyl, n-butyl, isobutyl, pentyl, neopentyl or isopentyl. The molar ratio of metal complex to aluminum compound is preferably from 1:10,000 to 100:1, more preferably from 1:1000 to 10:1, most preferably from 1:500 to 1:1. A most preferred borane activating cocatalyst comprises a strong Lewis acid, especially tris(pentafluorophenyl)borane. In another embodiment, two catalyst compounds are combined with at least one activator and a co-activator such as diethyl zinc or triethylaluminum.

The catalyst systems, or any of their components, used herein may be supported, typically on an organic or inorganic support. Suitable supports include silicas, aluminas, clays, zeolites, magnesium chloride, polyethyleneglycols, polystyrenes, polyesters, polyamides, peptides and the like. Polymeric supports may be cross-linked or not. Preferred supports include silica and fumed silica.

The process described herein is typically used to prepare polymers of C3 or greater olefins, such as propylene based polymers. Preferred polymers include polypropylene having from 0 to 50 mole % comonomer (preferably from 0.5 to 25 mole %, preferably from 1 to 15 mole %, preferably from 2 to 10 mole %), where the comonomer is selected from the group consisting of ethylene and linear, branched or cyclic C4 to C30 olefins, preferably alpha olefins. Preferred comonomers include ethylene, butene, hexene, octene, norbornene, 3,5,5,-trimethyl hexene-1, styrene, paramethylstyrene, 4-methylpentene-1, dicyclopentadiene, and the like. Dienes may also be used as the sole comonomer or as a ter- or tetra-monomer. Useful dienes include norbornadiene, hexadiene, butadiene, octadiene, or any other C4 to C30 linear, branched or cyclic diene.

The polymerization medium of the monomer, comonomers, solvents and diluents preferably comprises from 55-100 wt % propylene monomer; from 0 to 45 wt % of a comonomer mixture comprising at least one comonomer selected from ethylene, butene, hexene, octene, decene, 4-methylpentene-1, dicyclopentadiene, norbornene, C4-C2000 α-olefins, C4-C2000 α,internal-diolefins, and C4-C2000 α,ω-diolefins, provided that if the comomoner is ethylene it is present at from 0 to 20 wt % (based upon the weight of the monomers and comonomers entering the reactor). Alternately the C3 or greater monomer (preferably propylene) is present at 40 weight % or more (based upon the weight of the monomers and comonomers in entering the reactor [or alternatively at 40 wt % or more based upon the weight of the polymerization system]), and the comonoemrs are present at from 0 to 50 mole % comonomer (preferably 1 to 45 mole %) (based upon the combined monomer and comonomer feeds, provided that if the comonomer is ethylene it is present at 0.5 to 20 mole %.) [or alternatively at 0 to 50 wt %, based upon the weight of the polymerization system, provided that if the comonomer is ethylene it is present at 0.5 to 20 wt %.], or alternately at 1 to 50 wt % based upon the weight of the monomers and comonomers in entering the reactor, provided that if the comonomer is ethylene it is present at 0.5 to 20 wt %.

The process of the present invention can use one or more catalysts in any number of reactors in series or in parallel. Any number of catalysts can be deployed in any of the reactors of the polymerization reactor section of the present invention. For practical reasons, no more than five catalysts are preferred and no more than three catalysts are more preferred in any given reactor. The process of the present invention can use the same or different catalysts or catalyst mixtures in the different individual reactors of the reactor section of the present invention. For practical reasons, the deployment of no more than ten catalysts is preferred and the deployment of no more than six catalysts is more preferred in the polymerization process of the present invention.

The catalysts deployed in the process of the present invention can be homogeneously dissolved in the polymerization medium or can form a heterogeneous solid phase in the reactor. Operations with homogeneously dissolved catalysts are preferred. When the catalyst is present as a solid phase in the polymerization reactor, it can be supported or unsupported. The process of the present invention can use any combination of homogeneous and heterogeneous catalysts simultaneously present in one or more of the individual reactors of the polymerization reactor section, i.e., any reactor of the polymerization section of the present invention may contain one or more homogeneous catalysts and one or more heterogeneous catalysts simultaneously.

The process of the present invention can use any combination of homogeneous and heterogeneous catalysts deployed in the polymerization reactor section of the present invention. These combinations comprise scenarios when some or all reactors use a single catalyst and scenarios when some or all reactors use more than one catalyst. One or more catalysts deployed in the process of the present invention can be supported on particles, which either can be dispersed in the fluid polymerization medium or can be contained in a stationary catalyst bed.

When the supported catalyst particles are dispersed in the polymerization medium, they can be left in the polymeric product or can be separated from the product prior to its recovery from the reactor effluent in the fluid-liquid separation step that is downstream of the polymerization reactor section. If the catalyst particles are recovered, they either can be discarded or can be recycled with or without regeneration. The catalyst can also be supported on structured supports, such as monoliths comprising straight or tortuous channels, reactor walls, internal tubing, etc.

When the catalyst(s) is (are) supported, operation with dispersed particles is preferred. When the catalyst is supported on dispersed particles, operations without catalyst recovery are preferred, i.e., the catalyst is left in the polymeric product of the process of the present invention. Unsupported catalysts dissolved in the fluid reaction medium are most preferred. The catalyst(s) can be introduced any number of ways to the reactor. For example, the catalyst(s) can be introduced with the monomer-containing feed or separately.

In addition, the catalyst(s) can be introduced through one or multiple ports to the reactor. If multiple ports are used for introducing the catalyst(s), those ports can be placed at essentially the same or at different positions along the length of the reactor. If multiple ports are used for introducing the catalyst(s), the composition and the amount of catalyst feed through the individual ports can be the same or different. Adjustment in the amounts and types of catalyst through the different ports enables the modulation of polymer properties, such as molecular weight distribution, composition, composition distribution, crystallinity, etc.

Useful reactors include tubular, loop and or autoclave reactors, which, when more than one reactor is used, may be arranged in any order. In a preferred embodiment two or more reactors (which may be the same or different kind of reactor) are arranged in parallel and the effluent of each reactor is introduced into the same phase separation vessel. Preferably all of the reactors are operating in high pressure, preferably in a single phase (such as supercritical phase). In a preferred embodiment, there are two reactors operating in supercritical phase (preferably both reactors are tubular reactors) and the effluent streams are combined before or after pressure let-down and the combined stream is introduced into the phase separation vessel, which may or may not have internal agitation means such as a mixer.

The polymerization processes described herein operate well in tubular reactors and in autoclaves (also called stirred tank reactors). Autoclave reactors can be operated in batch or in continuous mode. To provide better productivity, and thus to lower production cost, continuous operation is preferred in commercial operations. Tubular reactors preferably operate in continuous mode. Typically, autoclave reactors have length-to-diameter ratios of 1:1 to 20:1 (preferably 4:1 to 20:1) and are typically fitted with a high-speed (up to 2000 RPM) multiblade stirrer. When the autoclave has a low length-to-diameter ratio (such as less than four) the feed streams are typically injected at only one position along the length of the reactor. Reactors with large diameters may have multiple injection ports at nearly the same position along the length of the reactor but radially distributed to allow for faster intermixing of the feed components with the reactor content. In the case of stirred tank reactors, the separate introduction of the catalyst is possible and often preferred. Such introduction prevents the possible formation of hot spots in the unstirred feed zone between the mixing point and the stirred zone of the reactor. Injections at two or more positions along the length of the reactor is also possible and sometimes preferred. For instance, in reactors where the length-to-diameter ratio is around 4:1 to 20:1, the reactor preferably can contain up to six different injection positions. Additionally, in the larger autoclaves, one or more lateral fixing devices support the high-speed stirrer. These fixing devices can also divide the autoclave into two or more zones. Mixing blades on the stirrer can differ from zone to zone to allow for a different degree of plug flow and back mixing, largely independently, in the separate zones. Two or more autoclaves with one or more zones can connect in series cascade to increase residence time or to tailor polymer structure. As mentioned above, a series reactor cascade typically has two or more reactors connected in series, in which the effluent of at least one upstream reactor is fed to the next reactor downstream in the cascade. Besides the effluent of the upstream reactor(s), the feed of any reactor in the series cascade can be augmented with any combination of additional monomer, catalyst, or solvent fresh or recycled feed streams. Two or more reactors can also be arranged in a parallel configuration. The individual arms of such parallel arrangements are referred to as reactor trains. These reactor trains in turn may themselves comprise one reactor or a reactor series cascade creating a combination of series and parallel reactors.

Tubular reactors may also be used in the process disclosed herein and more particularly tubular reactors capable of operating up to about 350 MPa. Tubular reactors are fitted with external cooling and one or more injection points along the (tubular) reaction zone. As in autoclaves, these injection points serve as entry points for monomers (such as propylene), one or more comonomer, catalyst, or mixtures of these. In tubular reactors, external cooling often allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Alternately, tubular reactors may be fabricated with smooth, unpolished internal surfaces to address wall deposits. Tubular reactors generally may operate at pressures of up to 360 MPa, may have lengths of 100-2000 meters or 100-4000 meters, and may have internal diameters of less than 12.5 cm (alternately less than 10 cm). Typically, tubular reactors have length-to-diameter ratios of 10:1 to 50,000:1 and may include up to 10 different injection positions along its length.

Reactor trains that pair autoclaves with tubular reactors can also serve in invention processes. In such instances, the autoclave typically precedes the tubular reactor or the two types of reactors form separate trains of a parallel reactor configuration. Such systems may have injection of additional catalyst and/or feed components at several points in the autoclave and more particularly along the tube length.

In both autoclaves and tubular reactors, at injection, feeds are preferably cooled to near ambient temperature or below to provide maximum cooling and thus maximum polymer production within the limits of maximum operating temperature. In autoclave operation, a preheater operates at startup, but not necessarily after the reaction reaches steady state if the first mixing zone has some back-mixing characteristics. In tubular reactors, the first section of double-jacketed tubing is heated rather than cooled and is operated continuously. A useful tubular reactor is characterized by plug flow. By plug flow, is meant a flow pattern with minimal radial flow rate differences. In both multizone autoclaves and tubular reactors, catalyst can be injected not only at the inlet, but also optionally at one or more points along the reactor. The catalyst feeds injected at the inlet and other injection points can be the same or different in terms of content, density, concentration, etc. Choosing different catalyst feeds allows polymer design tailoring. At the reactor outlet valve, the pressure drops to levels below that which critical phase separation occurs. Therefore, a downstream separation vessel may contain a polymer-rich phase and a polymer-lean phase. Typically, conditions in this vessel remain supercritical and temperature remains above the polymer product's crystallization temperature. The autoclave or tubular reactor effluent is depressurized on entering the high pressure separator (HPS).

In any of the multi-reactor systems described herein only one need be operated in the supercritical state or above the solid-fluid phase transition pressure and temperature (preferably above the fluid-fluid phase transition pressure and temperature); however all may be operated in the supercritical state or above the solid-fluid phase transition pressure and temperature(preferably above the fluid-fluid phase transition pressure and temperature).

Solvents/Diluents

One embodiment of this invention is the separation and recovery of polymers from a bulk polymerization medium, containing no inert solvent or diluent. In this preferred embodiment, the polymerization medium consists of a polymer dissolved in a mixture of unreacted monomer(s) and residual catalyst components. Preferably no solvent or diluent is used.

In other embodiments, solvents/diluents are used in the polymerization system to produce commercially useful products, to solubilize catalyst components, to reduce viscosity of the polymerization medium, or for other purposes. In embodiments where the solvent/diluent is used, the minimum quantity of solvent/diluent required to achieve the desired effects of producing commercially useful products, solubilizing catalyst components, reducing viscosity of the polymerization medium, etc. is used. In a preferred embodiment, the concentration of solvent required in the polymerization medium to achieve these effects is 0.1 to 40 wt %, or 0.2 to 20 wt %, or 0.3 to 10 wt %, or 0.4 to 5 wt %, or 0.5 to 1 wt %.

Diluents for useful in the present invention include one or more $C_2$-$C_{24}$ alkanes, such as ethane, propane, n-butane, i-butane, n-pentane, i-pentane, n-hexane, mixed hexanes, isohexane, cyclopentane, cyclohexane, etc., single-ring aromatics, such as toluene and xylenes. In some embodiments, the diluent comprises a mixture of these diluents. In some embodiments, the diluent is preferably recyclable.

In some embodiments the diluents include $C_4$ to $C_{150}$ isoparaffins, preferably $C_4$ to $C_{100}$ isoparaffins, preferably $C_4$ to $C_{25}$ isoparaffins, more preferably $C_4$ to $C_{20}$ isoparaffins. Preferably, the density (ASTM 4052, 15.6/15.6° C.) of these isoparaffins ranges from 0.67 to 0.83 g/cm$^3$; the pour point is −40° C. or less, preferably −50° C. or less, the viscosity (ASTM 445, 25° C.) is from 0.5 to 20 cSt at 25° C.; and the average molecular weights in the range of 100 to 300 g/mol. Some suitable isoparaffins are commercially available under the trade name ISOPAR (ExxonMobil Chemical Company, Houston Tex.), and are described in, for example, U.S. Pat. Nos. 6,197,285, 3,818,105 and 3,439,088, and sold commercially as ISOPAR series of isoparaffins. Other suitable isoparaffins are also commercial available under the trade names SHELLSOL (by Shell), SOLTROL (by Chevron Phillips) and SASOL (by Sasol Limited). SHELLSOL is a product of the Royal Dutch/Shell Group of Companies, for example Shellsol™ (boiling point=215-260° C.). SOLTROL is a product of Chevron Phillips Chemical Co. LP, for example SOLTROL 220 (boiling point=233-280° C.). SASOL is a product of Sasol Limited (Johannesburg, South Africa), for example SASOL LPA-210, SASOL-47 (boiling point=238-274° C.).

In another embodiment, diluents include $C_4$ to $C_{25}$ n-paraffins, preferably $C_4$ to $C_{20}$ n-paraffins, preferably $C_4$ to $C_{15}$ n-paraffins having less than 0.1 wt %, preferably less than 0.01 wt % aromatics. Some suitable n-paraffins are commercially available under the trade name NORPAR (ExxonMobil Chemical Company, Houston Tex.), and are sold commercially as NORPAR series of n-paraffins. In another embodiment, preferred diluents include dearomaticized aliphatic hydrocarbon comprising a mixture of normal paraffins, isoparaffins and cycloparaffins. Typically they are a mixture of $C_4$ to $C_{25}$ normal paraffins, isoparaffins and cycloparaffins, preferably $C_5$ to $C_{18}$, preferably $C_5$ to $C_{12}$. They contain very low levels of aromatic hydrocarbons, preferably less than 0.1, preferably less than 0.01 aromatics. Suitable dearomatized aliphatic hydrocarbons are commercially available under the trade name EXXSOL (ExxonMobil Chemical Company, Houston Tex.), and are sold commercially as EXXSOL series of dearomaticized aliphatic hydrocarbons.

Additional information on useful diluents is found at pages 11 to 13 of WO 2004/026921.

High-Pressure Separator, Recycle System, and Downstream Processing

In one embodiment of the invention, the polymerization is as described in WO2004/026921 (e.g. the pressure is above the cloud point pressure for the polymerization medium) and the polymerization medium is continuously transferred (preferably without heating) to a pressure reducing device (which may be a letdown valve), where the pressure is reduced below the cloud point pressure (and preferably the temperature is kept above the crystallization point of the polymer in the polymerization medium). This advantageously results in the formation of a more dense, polymer-rich phase and a less dense monomer-rich phase, which are then transferred to a fluid-liquid separation vessel (also referred to as a phase separation vessel) called a High Pressure Separator (HPS), where the monomer-rich phase and polymer-rich phase separate into two layers, typically via gravity settling. In a preferred embodiment, the pressure in the reactor (or at least one reactor if more than one is in use) is between 7 and 100 MPa higher than the pressure in the separation vessel (such as the high pressure separator), preferably between 15 and 75 MPa, preferably between and 25 and 50 MPa.

In another embodiment, one may increase the temperature of the polymerization medium by a heating device located upstream of the pressure reducing device (letdown valve) to prevent a solid-liquid phase transition (crystallization) of the polymer-rich phase in the HPS, which could occur as the polymer concentration increases or the medium cools, or to allow operation of the HPS at a higher pressure and thereby avoid full or partial vaporization of the monomer-rich phase. The monomer-rich phase is then typically recycled from the top of the HPS to the reactor while the polymer-rich phase is typically fed to one or more optional low-pressure phase separators (LPS) placed downstream of the first phase separator, and ultimately to a coupled devolatilizer—such as a LIST dryer (DTB) or devolatizing extruder. The operating pressures of the separators will generally decrease in the separator cascade causing the polymer-rich phase in a downstream separator to become more concentrated in the polymer and depleted in the light components of the polymerization system such as monomers and optional inert solvents diluents as compared to the corresponding phase concentrations upstream.

Phase Separation Temperature

In embodiments of the current invention, the optional heating of the polymerization medium upstream of the pressure letdown device is minimized within the constraints imposed by the phase diagram for the polymerization medium. For efficient phase separation, the temperature of the polymerization medium at the entrance to the pressure reducing device (letdown valve) is high enough to prevent a solid-liquid phase separation from taking place upstream of, or inside, the fluid-liquid phase separation vessel (HPS). The efficient phase separation temperature is also high enough such that when the pressure is reduced across the pressure reducing device (letdown valve), that there exists a pressure where an efficient separation of the polymerization medium into a monomer-rich phase and a polymer-rich phase can occur at a high enough pressure to prevent full or partial vaporization of the monomer-rich phase. The applicable operating range of temperatures and pressures that satisfy these criteria may be determined from a temperature-pressure phase diagram of the polymerization medium (such as the type depicted in FIG. 2). Because heating of the polymerization medium increases investment costs (installation of heaters), and also increases operating cost (consumption of a heating utility), the preferred embodiments of the process generally employ no heating if the polymerization system is already operating at a temperature that exceeds the efficient phase separation temperature criteria. Alternatively, embodiments where the polymerization medium is at a temperature lower than that required to satisfy the efficient phase separation criteria will employ heating to raise the temperature at the inlet of the pressure reducing device (letdown valve) to 0 to 100° C., or 5 to 50° C., or 10 to 30° C. above minimum required temperature for efficient phase separation.

In consideration of the efficient phase separation temperature criteria, the process of the current invention can be carried out at the following temperatures. In one embodiment, the temperature of the polymerization system is above the solid-fluid phase transition temperature of the polymer-containing fluid reaction medium at the reactor pressure, preferably at least 5° C. above the solid-fluid phase transition temperature of the polymer-containing fluid reaction medium at the reactor pressure, more preferably, at least 10° C. above the solid-fluid phase transformation point of the polymer-containing fluid reaction medium at the reactor pressure. In another embodiment, the temperature is between 50 and 350° C., or between 60 and 250° C., or between 70 and 200° C., or between 80 and 180° C., or between 90 and 160° C., or between 100 and 140° C.

Spinodal Decomposition

In preferred embodiments of the current invention, the pressure reducing device is designed to drop the pressure rapidly enough, and to an optimal pressure, via the process of spindoal decomposition, which results in a phase morphology of an interpenetrating network of the two phases (also called a co-continuous morphology), with the desirable result that the polymer-rich and monomer-rich phases disengage easily and settle rapidly in the fluid-liquid gravity separation vessel (such as an HPS). Spinodal decomposition prevents the formation of a very slow disengaging and slow settling mixture of monomer-rich and polymer-rich phases with a morophology that has droplets of monomer-rich phase dispersed in a continuous polymer-rich phase, which tends to occur naturally when the polymer concentration in the fluid exceeds a critical value, and when temperature and pressure in the phase separating vessel are in the region of the phase diagram between the fluid-liquid phase boundary (bindoal boundary) and the spindoal boundary as illustrated by the cross-hatched area in FIG. 2. In the preferred embodiments of the current invention, the polymer concentration in the polymerization medium is always higher than the critical concentration described above (and conceptually illustrated in FIG. 1) and thus these embodiments utilize the process of spinodal decomposition to avoid gravity settling problems. In one embodiment of the spinodal decomposition process for supercritical polymerization systems (such as those described in WO2004/026921), the rate of pressure reduction across the pressure reducing device (letdown valve) is 1 MPa/sec or more, or 2 MPa/sec or more, or 4 MPa/sec or more, or 6 MPa/sec or more.

Phase Separation Pressure

In all embodiments of the current invention, the pressure downstream of the pressure reducing device (letdown valve) and inside the fluid-liquid phase separation vessel (such as an HPS) is selected to be below the cloud point pressure to ensure that a fluid-liquid phase separation will take place, but high enough to be above the vapor pressure of the monomer-rich phase to prevent full or partial vaporization of the monomer-rich phase. In preferred embodiments, to induce rapid phase separation and settling, the pressure in the fluid-liquid phase separation vessel (such as an HPS) is lower than the spinodal boundary pressure. Within this preferred pressure range, ie. below the spinodal boundary pressure and above the vapor pressure of the monomer-rich phase, an operating pressure can be chosen that will prove to be most economical. Higher pressures reduce the cost of pumping or compression of the monomer-rich phase for recycle, but higher pressures also reduce the rate of phase disengagement and result in higher density of the monomer-rich phase, which reduces the density difference between polymer-rich and monomer-rich phases, thereby slowing the rate of settling in the fluid-liquid phase separation vessel (such as an HPS), and ultimately requiring a larger vessel. In one embodiment of the invention, the pressure downstream of the pressure reducing device (letdown valve) and inside the fluid-liquid phase separation vessel (HPS) is below the spinodal boundary pressure, or at least 1 MPa lower than the spinodal boundary pressure, or at least 5 MPa lower than the spinodal boundary pressure, or at least 10 MPa lower than the spinodal boundary pressure. In one embodiment, the pressure is no lower than the vapor pressure of monomer-rich phase, no lower than 0.2 MPa above, no lower than 1 MPa above, or no lower than 10 MPa above the vapor pressure of the monomer-rich phase. In another embodiment, the difference in density between the polymer-rich phase and the monomer-rich phase is at least 0.1 g/mL, or at least 0.2 g/mL, or at least 0.3 g/mL, or at least 0.4 g/mL, or at least 0.5 g/mL or at least 0.6 g/mL. Density of the phases at any given pressure and temperature is measured by simple volumetric methods, for example by measuring the weight of a phase with a known volume. In another embodiment, the pressure is in the phase separation vessel (such as an HPS) between 2 and 40 MPa, 5 and 30 MPa, 7 and 20 MPa, or between 10 and 18 MPa. In another embodiment, the HPS operates at a pressure above 138 MPa, preferably above 150 MPa, preferably above 200 MPa.

At the reactor outlet valve, the pressure drops to begin the separation of polymer and unreacted monomer, co-monomers, inerts, like ethane, propane, solvents, like hexanes, toluene, etc. The temperature in the separation vessel will be maintained above the polymer product's crystallization temperature (or above 80° C. if the polymer product has no crystallization point) but the pressure may be below the critical point. The pressure need only be high enough that the monomer, for example propylene, can be condensed against standard cooling water. The liquid recycle stream can then be recycled to the reactor with a liquid pumping system instead of the hyper-compressors required for polyethylene units. The lower pressure in this separator will reduce the monomer concentration in the liquid polymer phase which will result in a much lower polymerization rate. This polymerization rate in some embodiments may be low enough to operate this system without adding a catalyst poison or "killer". If a catalyst killer is required (e.g., to prevent reactions in the high pressure recycle) then provision must be made to remove any potential catalyst poisons from the recycled propylene rich monomer stream e.g. by the use of fixed bed adsorbents or by scavenging with an aluminum alkyl.

Alternately, the separation vessel may be operated over the critical pressure of the monomer or monomer blend but within the monomer/polymer two-phase region. This is an economically preferred method if the polymer is to be produced with a revamped high-pressure polyethylene (HPPE) plant. The recycled separation vessel overhead is cooled and dewaxed before being returned to the suction of the secondary compressor.

The polymer from this separation vessel may then go through another pressure reduction step to a low pressure separator. The temperature of this vessel will be maintained above the polymer melting point so that the polymer from this vessel can be fed as a liquid directly to an extruder or static mixer. The pressure in this vessel will be kept low by using a compressor to recover the unreacted monomers, etc to a condenser and pumping system.

Polymer Recovery

The polymer-rich phase may be sent directly to a coupled devolatilization system, which may contain one or more flash vessels, or low pressure separators (LPS), in series, each operating at a successively lower pressure, and the devolatization system may include as a final step a devolatizing extruder or other devolatizing devices such as a LIST DTB, which may be obtained from LIST USA Inc., of Charlotte, N.C. The low pressure separator vessel(s) may operate adiabatically, or optionally may have internal heaters of the thin film or falling strand type. This devolatilization is a separation process to separate remaining volatiles from the final polymer, without resorting to older, inefficient processes such as steam stripping. The final devolatizing device (extruder, LIST DTB, etc.) may operate under a strong vacuum, and may optionally use stripping agents such as water or nitrogen, to further reduce the volatiles content of the polymer. Once devolatized, the product exits the final devolatizing step and is then transferred on for further processing, such as pelletization and packaging.

Efficient and Economical Recycle of Monomer-Rich Phase

In preferred embodiments of the invention, the monomer-rich phase is recycled to the polymerization system with minimal processing to avoid costly investment in recycle equipment, and also to avoid consumption of costly utilities including heating media (steam, hot oil, electricity, etc.) and cooling media (cooling water, brine, cooling air, etc.). In embodiments where the temperature of the monomer-rich phase in the fluid-liquid separation vessel (such as an HPS) is higher than the polymerization system feed temperature, some cooling of the monomer-rich phase will be required. If removal of water or other polar contaminants is not required to maintain an economical catalyst productivity in the polymerization system, then cooling of the monomer-rich recycle stream to the polymerization system feed temperature may be all that is required. One embodiment of this type involves cooling the monomer-rich recycle stream to $-40$ to $100°$ C., or $-20$ to $90°$ C., or 0 to $90°$ C., or 20 to $90°$ C., or 50 to $90°$ C. Where removal of water or polar contaminants is required to maintain an economical catalyst productivity in the polymerization system, then drying over desiccant beds may be used, and the monomer-rich recycle stream must be a cooled to the lower of the polymerization feed temperature or the temperature where the desiccant has an acceptable capacity for removing water and/or other polar impurities (eg. catalyst poisons). In this case where desiccant drying is required, one embodiment involves cooling the monomer-rich recycle stream to $-40$ to $80°$ C., or $-20$ to $60°$ C., or 0 to $40°$ C., or 20 to $40°$ C. When cooling the monomer-rich recycle stream, low or very low molecular weight polymer present in the monomer-rich stream may precipitate as solids, which may optionally be removed through filters, "knock-out" pots, etc. or left in the return stream depending upon product requirements and the steady-state concentration of the low molecular weight polymer fraction in the product.

Heat Integration

In embodiments of the invention where heating of the polymerization medium and cooling of the monomer-rich recycle stream are both required, it is often advantageous to install a heat integrating exchanger, which will be defined as any device that exchanges heat between the monomer-rich phase leaving the fluid-liquid separator and the polymerization medium upstream of the pressure reducing device. This exchange of heat simultaneously heats the polymerization medium and cools the monomer-rich recycle stream. In embodiments where this exchange of heat is insufficient to raise the polymerization medium to its desired temperature and/or to cool the monomer-rich recycle stream to its desired temperature, supplemental heating and cooling systems may be employed in conjunction with the heat integrating exchanger. In such embodiments, preferred heating media for the polymerization medium include, but are not restricted to, steam, hot oil systems, and electric heater systems. Preferred supplemental cooling media for the monomer-rich recycle stream include, but are not restricted to, fresh water cooling systems, salt water cooling systems, air-cooled exchangers, and the like.

Application to Two-Phase Polymerization System

In another embodiment of the invention, the polymerization system (such as that described in WO2004/026921) is operated at a pressure below the cloud point pressure, with the two phase (fluid-liquid) polymerization medium transported directly to a gravimetric separation vessel, optionally by way of a pressuring reducing device where the pressure may be further lowered if desired to enhance phase separation of the polymer-rich and monomer-rich phases. In this embodiment, the monomer-rich phase is recycled to the polymerization system in the same manner as described for a polymerization system operating above the cloud point pressure. Other aspects of the current invention, including spinodal decomposition, supplemental cooling of the monomer-rich recycle stream, desiccant drying of the monomer-rich recycle stream, removal of low molecular weight polymer that precipitates from the monomer-rich recycle stream, hydrogen removal, and catalyst killing may also be employed in this embodiment.

Hydrogen Removal from Monomer-Rich Recycle Stream

Many of the catalyst systems useful herein (such as those disclosed in WO2004/026921) produce small amounts of hydrogen as a byproduct of the polymerization reaction. Additionally, hydrogen may be a reactor feed for the polymerization process described herein. Thus, in embodiments of the polymerization process where the hydrogen is not totally consumed in the polymerization process, there will be small amounts of hydrogen in the polymerization medium, and most of this hydrogen will remain in the monomer-rich phase leaving the fluid-liquid phase separation vessel (such as an HPS). In one embodiment, this amount of hydrogen in the monomer-rich recycle stream is less than the amount of hydrogen added to the combined feed stream to the polymerization process, and in this embodiment, the fresh makeup of hydrogen to the polymerization process feed can be reduced to compensate for this recycled hydrogen, and no further processing of the monomer-rich recycle stream to remove hydrogen is required. In another embodiment, the amount of hydrogen in the monomer-rich recycle stream is greater than the total amount of hydrogen desired in the combined feed stream to the polymerization process, and in this embodiment, an additional treatment step may be added to the process for recycling the monomer-rich phase. This additional treatment step may comprise, but is not restricted to, single or multiple stage flash vessels, fractionation towers, or hydrogenation beds. Treatment for removal of hydrogen may be applied to the entire monomer-rich recycle stream, or in instances where the hydrogen removal requirements permit, to only a portion, or slip-stream of the monomer-rich recycle stream.

Catalyst Killing

The use of the processes disclosed herein reduces the monomer concentration in the liquid polymer-rich phase relative to the polymerization medium, which, in turn, results in a much lower post-polymerization rate in polymer-rich phase. This polymerization rate may be low enough to operate this system without adding a catalyst poison or "killer". If no killing compounds are added then the killer removal step can be eliminated. If a catalyst killer is required, then provision must be made to remove any potential catalyst poisons from the recycled monomer-rich stream (e.g. by the use of desiccant beds or by scavenging with an aluminum alkyl). A polar species such as water, alcohol or sodium/calcium stearate may be employed as the killing agent. The choice and quantity of killing agent will depend on the requirements for clean up of the recycle propylene and comonomers as well as the product properties, if the killing agent has low volatility.

Choice of Propylene Feed Purity

Propylene is available commercially at two levels of purity-polymer grade at 99.5% and chemical grade at about 93 to 95%. The choice of feed will set the level of purge required from the recycle to avoid over dilution of the feed by inert propane.

Polymer Products

The polymers separated and recovered by invention processes may have any structures including block, linear, radial, star, branched, and combinations of these. Some invention embodiments separate and recover polypropylene and copolymers of polypropylene with a unique microstructure. The process of the invention can be used to produce novel isotactic and syndiotactic polymer compositions. In other embodiments, the invention processes may be used to produce crystalline polymers.

Some embodiments of the disclosed processes separate and recover polymers, typically propylene polymers, with a melting point of 70 to 165° C., and/or a weight-average molecular weight of 2,000 to 1,000,000; 10,000 to 1,000,000; 15,000 to 500,000; 25,000 to 250,000; or 35,000 to 150,000 g/mol.

Some embodiments of the invention separate and recover polymers with a heat of fusion, $\Delta H_f$, of 1-30 J/g, 2-20 J/g, or 3-10 J/g. In another embodiment, the process of this invention yields polymers having a $\Delta H_f$ of up to 110 J/g, preferably 50 to 110 J/g, and more preferably 70 to 100 J/g.

In another embodiment, the polymers separated and recovered herein have a melt viscosity of less than 10,000 centipoises at 180° C. as measured on a Brookfield viscometer, or between 1000 to 3000 cPs for some embodiments (such as packaging and adhesives) and preferably between 5000 and 10,000 cP for other applications.

This invention further relates to:
1. A process for polymerizing olefins, comprising the steps of:
    (a) contacting in one or more reactors, in a dense fluid homogeneous polymerization system, olefin monomers having three or more carbon atoms present at 30 weight % or more (based upon the weight of the monomers and comonomers entering the reactor [or alternatively at 40 wt % or more based upon the weight of the polymerization system]), with: 1) one or more catalyst compounds, 2) one or more activators, 3) from 0 to 50 mole % comonomer (preferably 1 to 45 mole %) (based upon the amount of the monomers and comonomers entering the reactor) [or alternatively at 0 to 50 wt %, based upon the weight of the polymerization system], and 4) 0 to 40 wt % (preferably 0 to 25 wt %, more preferably 0 to 10 wt %) diluent or solvent (based upon the weight of the polymerization system), at a temperature above the crystallization temperature of the polymerization system and a pressure no lower than 10 MPa (preferably no lower than 1 MPa) below the cloud point pressure of the polymerization system and preferably less than 200 MPa where the polymerization system comprises the monomers, any comonomer present, any scavenger, any diluent or solvent present and the polymer product;
    (b) forming a reactor effluent comprising a polymer-monomer mixture;
    (c) optionally heating the polymer-monomer mixture of (b) after it exits the reactor and before or after the pressure is reduced in step (e);
    (d) collecting the polymer-monomer mixture of (b) in a separation vessel;
    (e) reducing the pressure of the reactor effluent comprising the polymer-monomer mixture of (b) below the cloud point pressure to form a two-phase mixture comprising a polymer-rich phase and a monomer-rich phase either before or after collecting the polymer-monomer mixture in the separation vessel where the pressure in the reactor (or at least one reactor if more than one is in use) is between 7 and 100 MPa higher than the pressure in the separation vessel and the temperature in the separation vessel is above the crystallization temperature of the polymer or above 80° C. if the polymer has no crystallization temperature, whichever is higher;
    (f) separating the monomer-rich phase from the polymer-rich phase; and
    (g) recycling the separated monomer-rich phase to one or more reactors of (a); and
    (h) recovering polymer from the polymer-rich phase.
2. The process of paragraph 1, further comprising the step of heating the polymer-monomer mixture within the separation vessel (preferably to prevent crystallization of the polymer-rich phase) or heating the polymer in an outside heating loop fluidly connected to the separation vessel (preferably to prevent crystallization of the polymer-rich phase).
3. The paragraph of claim 1 or 2, wherein the polymer-monomer mixture collected in step (d) is, before reducing the pressure, at a pressure above the cloud point pressure and at a temperature above the crystallization temperature of the polymer-monomer mixture.
4. The process of paragraph 1, 2, or 3 further comprising the step of separating volatiles from the polymer-rich phase.
5. The process of paragraph 1, 2, 3 or 4, further comprising the step of feeding the polymer-rich phase to a coupled devolatilizer to separate volatiles from the polymer.
6. The process of paragraph 5, wherein the coupled devolatilizer operates under a low vacuum enabling the polymer-rich phase to flash into the devolatilizer.
7. The process of paragraph 5 or 6, wherein the coupled devolatilizer is a devolatizing extruder.
8. The process of paragraph 1, 2, 3, 4, 5, 6, or 7 wherein the separation step (f) is conducted below the cloud point of the polymerization system and above the crystallization temperature of the polymer-rich phase of (f).
9. The process of paragraph 8, wherein the separation vessel is a gravimetric separation vessel.
10. The process of any of paragraphs 1 to 9, further comprising the step of removing low-molecular weight polymer (e.g. a weight average molecular weight (Mw) of less than 10,000 g/mol, preferably less than 5000 g/mol, preferably less than 1000 g/mol) from the separated monomer-rich phase recycled in step (g).
11. The process of paragraph 10, wherein the low-molecular weight polymer is removed through the use of at least one knock-out pot.
12. The process of any of paragraphs 1 to 11, wherein the olefin monomers are present in the polymerization system at 55 weight % or more, preferably 75 wt % or more.
13. The process of any of paragraphs 1 to 12, wherein the pressure of the polymerization system is less than about 140 MPa, preferably less than 100 MPa, preferably between 15 and 140 MPa, preferably between 15 and 50 MPa.
14. The process of any of paragraphs 1 to 13, wherein the temperature is between 60 and 180° C., preferably 85 and 180° C., preferably 95 and 180° C., preferably between 100 and 180° C.
15. The process of any of paragraphs 1 to 14, wherein the monomer-rich phase comprises less than about 0.1 wt % low molecular weight polymer.
16. The process of any of paragraphs 1 to 15, wherein the monomer-rich phase has a density of about 0.3 to about 0.4 grams/mL.
17. The process of any of paragraphs 1 to 16, wherein the polymer-rich phase has a density of about 0.6 to about 0.7 grams/mL.
18. The process of any of paragraphs 1 to 17, wherein in step (e), the pressure is dropped at a rate of at least about 2 MPa/sec, preferably at least 3 MPa/sec, preferably at least 4 MPa/sec, preferably at least 5 MPa/sec preferably at least 6 MPa/sec, preferably at least 7 MPa/sec.
19. The process of any of paragraphs 1 to 18, wherein step (a) is conducted in a single liquid phase.
20. The process of paragraph 19, wherein the temperature and pressure of the polymerization system are held at a value above the fluid-solid phase transition temperature and pressure.
21. The process of any of paragraphs 1 to 18, wherein step (a) is conducted in a two phase fluid-fluid system.
22. The process of paragraph 21, wherein the temperature of the polymerization system is held at a value below the cloud point temperature and above the fluid-solid phase transition temperature of the polymerization system.
23. The process of any of paragraphs 1-22, wherein solvent and or diluent is present in the polymerization system at less than 10 wt %, preferably less than 1 wt %.
24. The process of any of paragraphs 1 to 23, wherein the olefin monomer having three or more carbon atoms comprises propylene.
25. The process of any of paragraphs 1 to 24, wherein the polymerization system comprises from 55-100 wt % propylene monomer; from 0 to 45 wt % of a comonomer mixture comprising at least one comonomer selected from ethylene, butene, hexene, octene, decene, dodecene, 4-methylpentene-1, dicyclopentadiene, norbornene, C4-C2000 α-olefins, C4-C2000 α,internal-diolefins, and C4-C2000 α,ω-diolefins, preferably one or more of ethylene, butene, hexene, or octene.
26. The process of any of paragraphs 1 to 25, wherein the catalyst compound is represented by the formula:

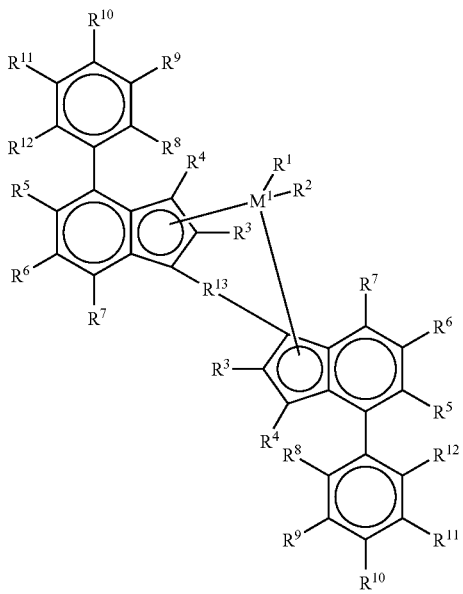

where $M^1$ is selected from titanium, zirconium, hafnium, vanadium, niobium, tantalum, chromium, molybdenum, or tungsten (preferably zirconium and or hafnium);
$R^1$ and $R^2$ are identical or different and are selected from hydrogen atoms, $C_1$-$C_{10}$ alkyl groups, $C_1$-$C_{10}$ alkoxy groups, $C_6$-$C_{10}$ aryl groups, $C_6$-$C_{10}$ aryloxy groups, $C_2$-$C_{10}$ alkenyl groups, $C_2$-$C_{40}$ alkenyl groups, $C_7$-$C_{40}$ arylalkyl groups, $C_7$-$C_{40}$ alkylaryl groups, $C_8$-$C_{40}$ arylalkenyl groups, OH groups or halogen atoms; or conjugated dienes that are optionally substituted with one or more hydrocarbyl, tri(hydrocarbyl)silyl groups or hydrocarbyl tri(hydrocarbyl)silylhydrocarbyl groups (preferably $R^1$ and $R^2$ are an alkyl such as methyl or ethyl or are a halide such as chloride);
$R^3$-$R^{12}$ are the same or different and are selected from hydrogen atoms, halogen atoms, $C_1$-$C_{10}$ halogenated or unhalogenated alkyl groups, $C_6$-$C_{10}$ halogenated or unhalogenated aryl groups, $C_2$-$C_{10}$ halogenated or unhalogenated alkenyl groups, $C_7$-$C_{40}$ halogenated or unhalogenated arylalkyl groups, $C_7$-$C_{40}$ halogenated or unhalogenated alkylaryl groups, $C_8$-$C_{40}$ halogenated or unhalogenated arylalkenyl groups, —NR'$_2$, —SR', —OR', —OSiR'$_3$ or —PR'$_2$ radicals in which R' is one of a halogen atom, a $C_1$-$C_{10}$ alkyl group, or a $C_6$-$C_{10}$ aryl group; or two or more adjacent radicals $R^5$ to $R^7$ together with the atoms connecting them can form one or more rings (preferably $R^3$ is methyl, ethyl or butyl), and adjacent radicals $R^{11}$ and $R^{12}$ can form one or more saturated or aromatic rings (preferably $R^{11}$ and $R^{12}$ combine with the phenyl ring to form a substituted or unsubstituted naphthyl group);
$R^{13}$ is selected from:

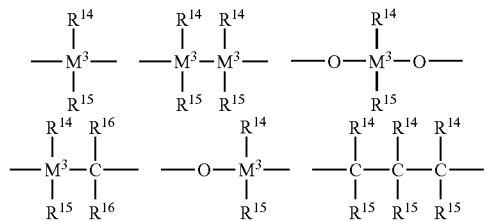

—B($R^{14}$)—, —Al($R^{14}$)—, —Ge—, —Sn—, —O—, —S—, —SO—, —SO$_2$—, —N($R^{14}$)—, —CO—, —P($R^{14}$)—, —P(O)—($R^{14}$)—, —B(NR$^{14}$R$^{15}$)—and —B[N(SiR$^{14}$R$^{15}$R$^{16}$)$_2$]—, $R^{14}$, $R^{15}$ and $R^{16}$ are each independently selected from hydrogen, halogen, $C_1$-$C_{20}$ alkyl groups, $C_6$-$C_{30}$ aryl groups, $C_1$-$C_{20}$ alkoxy groups, $C_2$-$C_{20}$ alkenyl groups, $C_7$-$C_{40}$ arylalkyl groups, $C_8$-$C_{40}$ arylalkenyl groups and $C_7$-$C_{40}$ alkylaryl groups, or $R^{14}$ and $R^{15}$, together with the atom(s) connecting them, form a ring; and $M^3$ is selected from carbon, silicon, germanium and tin, or $R^{13}$ is represented by the formula:

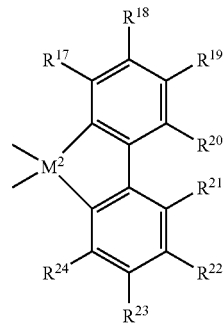

wherein $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; $M^2$ is carbon, silicon, germanium, or tin (preferably $R^{13}$ is dimethyl silyl or diphenylsilyl).
27. The process of any of paragraphs 1 to 26 wherein the activator is selected from alumoxane(preferably methylalumoxane) and non-coordinating anions (preferably trimethylammonium tetrakis(pentafluorophenyl)borate, N,N-dimethylanilinium tetrakis(pentafluorophenyl)borate, triphenylcarbenium tetra(perfluorophenyl)borate, or N,N-dimethylanilinium tetra(perfluorophenyl)borate).

28. The process of any of paragraphs 1 to 27 wherein hydrogen and excess catalyst killer are removed from the mononomer-rich phase prior to being recycled to the one or more polymerization reactor.

29. The process of any of paragraphs 1 to 28 wherein the monomer-rich phase and the polymer-rich phase differ in density by at least 0.2 g/mL.

30. The process of any of paragraphs 1 to 29 wherein the polymerization system is a single-phase supercritical fluid.

31. The process of any of paragraphs 1 to 30 wherein the residence time in the separation vessel is from 1 minute to 30 minutes, preferably from 1 to 15 minutes.

All documents described herein are incorporated by reference herein, including any priority documents and/or testing procedures to the extent they are not inconsistent with this text, provided however that any priority document not named in the initially filed application is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. A process for polymerizing olefins, comprising the steps of:
   (a) contacting in one or more reactors, in a dense fluid homogeneous polymerization system, olefin monomers having three or more carbon atoms present at 30 weight % or more (based upon the weight of the monomers and comonomers entering the reactor), with: 1) one or more catalyst compounds, 2) one or more activators, 3) from 0 to 50 mole % comonomer (based upon the amount of the monomers and comonomers entering the reactor), and 4) 0 to 40 wt % diluent or solvent (based upon the weight of the polymerization system), at a temperature above the crystallization temperature of the polymerization system and a pressure no lower than 1 MPa below the cloud point pressure of the polymerization system and less than 200 MPa, where the polymerization system comprises the monomers, any comonomer present, any diluent or solvent present, any scavenger present, and the polymer product;
   (b) forming a reactor effluent comprising a polymer-monomer mixture;
   (c) optionally heating the polymer-monomer mixture of (b) after it exits the reactor and before or after the pressure is reduced in step (e);
   (d) collecting the polymer-monomer mixture of (b) in a separation vessel;
   (e) reducing the pressure, at a rate of at least about 2 MPa/sec, of the reactor effluent comprising the polymer-monomer mixture of (b) below the cloud point pressure to form a two-phase mixture comprising a polymer-rich phase and a monomer-rich phase either before or after collecting the polymer-monomer mixture in the separation vessel where the pressure in the reactor (or at least one reactor if more than one is in use) is between 7 and 100 MPa higher than the pressure in the separation vessel and the temperature in the separation vessel is above the crystallization temperature of the polymer or above 80° C. if the polymer has no crystallization temperature, whichever is higher;
   (f) separating the monomer-rich phase from the polymer-rich phase;
   (g) recycling the separated monomer-rich phase to one or more reactors of (a); and
   (h) recovering polymer from the polymer-rich phase, where, if more than one reactor is in use, then the reactors are connected in series.

2. The process of claim 1, further comprising the step of heating the polymer-monomer mixture within the separation vessel or in an outside heating loop fluidly connected to the separation vessel.

3. The process of claim 1, wherein the polymer-monomer mixture collected in step (d) is, before the pressure is reduced, at a pressure above the cloud point pressure and at a temperature above the crystallization temperature of the polymer-monomer mixture.

4. The process of claim 1, further comprising the step of separating volatiles from the polymer-rich phase.

5. The process of claim 1, further comprising the step of feeding the polymer-rich phase to a coupled devolatilizer to separate volatiles from the polymer.

6. The process of claim 1, wherein the separation step (f) is conducted below the cloud point of the polymerization system and above the crystallization temperature of the polymer-rich phase of (f).

7. The process of claim 1, wherein the separation vessel is a gravimetric separation vessel.

8. The process of claim 1, further comprising the step of removing polymer having an Mw of 10,000 g/mol or less from the separated monomer-rich phase recycled in step (g).

9. The process of claim 8, wherein the polymer having an Mw of 10,000 g/mol or less is removed through the use of at least one knock-out pot.

10. The process of claim 1, wherein the pressure of the polymerization system is less than about 140 MPa and the temperature is between about 60 and about 180° C.

11. The process of claim 1, wherein the monomer-rich phase comprises less than about 0.1 wt % low molecular weight polymer.

12. The process of claim 1, wherein in step (e), the pressure is dropped at a rate of 6 MPa/sec or higher.

13. The process of claim 1, wherein step (a) is conducted in a single liquid phase.

14. The process of claim 13, wherein the temperature and pressure of the polymerization system are held at a value above the fluid-solid phase transition temperature and pressure.

15. The process of claim 1, wherein step (a) is conducted in a two phase fluid-fluid system.

16. The process of claim 15, wherein the temperature of the polymerization system is held at a value below the cloud point temperature and above the fluid-solid phase transition temperature of the polymerization system.

17. The process of claim 1, wherein solvent and or diluent is present in the polymerization system at less than 10 wt %.

18. The process of claim 1, wherein solvent and or diluent is present in the polymerization system at less than 1 wt %.

19. The process of claim 1, wherein the olefin monomer having three or more carbon atoms comprises propylene.

20. The process of claim 1, wherein the polymerization system comprises from 55-100 wt % propylene monomer; from 0 to 45 wt % of a comonomer mixture comprising at least one comonomer selected from the group consisting of ethylene, butene-1, hexene-1, dodecene-1, 4-methylpentene-1, dicyclopentadiene, norbornene, octene-1, and decene-1.

21. The process of claim 1 wherein hydrogen and/or excess catalyst killer are removed from the monomer-rich phase prior to being recycled to the one or more reactors of (a).

22. The process of claim 1 wherein the monomer-rich phase and the polymer-rich phase differ in density by at least 0.2 g/mL.

23. The process of claim 1 wherein the polymerization system is a single-phase supercritical fluid.

24. The process of claim 1 wherein the residence time in the separation vessel is from 1 minute to 30 minutes.

25. A process for polymerizing olefins, comprising the steps of:
  (a) contacting in one or more reactors, in a dense fluid homogeneous polymerization system, propylene present at 40 weight % or more (based upon the weight of the monomers and comonomers entering the reactor), with: 1) one or more catalyst compounds, 2) one or more activators, 3) from 0 to 50 mole % comonomer (based upon the amount of monomers and comonomers entering the reactor) selected from the group consisting of ethylene, butene-1, hexene-1, octene-1, decene-1, dodecene-1, norbornene, cyclopentadiene, 4-methylpentene-1, and 3,5,5-trimethylhexene-1, and 4) 0 to 40 wt % diluent or solvent (based upon the weight of the polymerization system), at a temperature above the crystallization temperature of the polymerization system and between 60 and 180° C. and a pressure between 15 and 200 MPa where the polymerization system comprises the monomers, any comonomer present, any diluent or solvent present, any scavenger present, and the polymer product;
  (b) obtaining a reactor effluent comprising a polymer-monomer mixture;
  (c) optionally heating the polymer-monomer mixture of (b) and before or after the pressure is reduced in step (e);
  (d) collecting the polymer-monomer mixture of (b) in a separation vessel that is a gravity settling device and allowing the polymer-monomer mixture to reside for at least one minute in the separation vessel;
  (e) reducing the pressure of the reactor effluent comprising the polymer-monomer mixture of (b) below the cloud point pressure of the polymer-monomer mixture to form a two-phase mixture comprising a polymer-rich phase and a monomer-rich phase either before or after collecting the polymer-monomer mixture in the separation vessel;
  (f) separating the monomer-rich phase from the polymer-rich phase where the two phases differ in density by at least 0.2 g/mL;
  (g) recycling the separated monomer-rich phase to one or more reactors of (a);
  (h) transferring the polymer rich phase to one or more phase separation or flash vessels.

26. The process of claim 25, further comprising the step of heating the polymer-monomer mixture within the separation vessel or in an outside heating loop fluidly connected to the separation vessel.

27. The process of claim 25, wherein the polymer-monomer mixture collected in step (d) is, before the pressure is reduced, at a pressure above the cloud point pressure and at a temperature above the crystallization temperature of the polymer-monomer mixture.

28. The process of claim 25, further comprising the step of separating volatiles from the polymer-rich phase.

29. The process of claim 25, further comprising the step of feeding the polymer-rich phase to a coupled devolatilizer to separate volatiles from the polymer.

30. The process of claim 25, wherein the separation step (f) is conducted below the cloud point of the polymerization system and above the crystallization temperature of the polymer-rich phase of (f).

31. The process of claim 25, wherein the residence time in the separation vessel is from 1 minute to 30 minutes.

32. The process of claim 25, further comprising the step of removing polymer having an Mw of 10,000 g/mol or less from the separated monomer-rich phase recycled in step (g).

33. The process of claim 32, wherein the polymer having an Mw of 10,000 g/mol or less is removed through the use of at least one knock-out pot.

34. The process of claim 25, wherein the pressure of the polymerization system is less than about 140 MPa and the temperature is between about 60 and about 180° C.

35. The process of claim 25, wherein the monomer-rich phase comprises less than about 0.1 wt % low molecular weight polymer.

36. The process of claim 25, wherein in step (e), the pressure is dropped at a rate of at least about 2 MPa/sec.

37. The process of claim 25, wherein step (a) is conducted in a single liquid phase.

38. The process of claim 37, wherein the temperature and pressure of the polymerization system are held at a value above the fluid-solid phase transition temperature and pressure.

39. The process of claim 25, wherein step (a) is conducted in a two phase fluid-fluid system.

40. The process of claim 39, wherein the temperature of the polymerization system is held at a value below the cloud point temperature and above the fluid-solid phase transition temperature of the polymerization system.

41. The process of claim 25, wherein solvent and or diluent is present in the polymerization system at less than 10 wt %.

42. The process of claim 25, wherein solvent and or diluent is present in the polymerization system at less than 1 wt %.

43. The process of claim 25, wherein hydrogen and/or excess catalyst killer are removed from the monomer-rich phase prior to being recycled to the one or more reactors of (a).

44. The process of claim 25, wherein the polymerization system is a single-phase supercritical fluid.

45. The process of claim 1 wherein one or more of the reactors is a tubular or autoclave reactor.

46. The process of claim 1 wherein one or more of the reactors is a tubular or autoclave reactor and the process is continuous.

47. The process of claim 1 wherein step (c) comprises heating the polymermonomer mixture of (b) after it exits the reactor and before or after the pressure is reduced in step (e).

48. A process for polymerizing olefins, comprising the steps of:
  (a) contacting in one or more reactors, in a dense fluid homogeneous polymerization system, propylene present at 30 weight % or more (based upon the weight of the monomers and comonomers entering the reactor), with: 1) one or more catalyst compounds, 2) one or more activators, 3) from 0 to 50 mole % comonomer (based upon the amount of the monomers and comonomers entering the reactor), and 4) 0 to 40 wt % diluent or solvent (based upon the weight of the polymerization system), at a temperature above the crystallization temperature of the polymerization system and a pressure no lower than 1 MPa below the cloud point pressure of the polymerization system and less than 200 MPa, where the polymerization system comprises the monomers, any comonomer present, any diluent or solvent present, any scavenger present, and the polymer product;

(b) forming a reactor effluent comprising a polymer-monomer mixture;

(c) optionally heating the polymer-monomer mixture of (b) after it exits the reactor and before or after the pressure is reduced in step (e);

(d) collecting the polymer-monomer mixture of (b) in a separation vessel;

(e) reducing the pressure, at a rate of at least about 2 MPa/sec, of the reactor effluent comprising the polymer-monomer mixture of (b) below the cloud point pressure to form a two-phase mixture comprising a polymer-rich phase and a monomer-rich phase either before or after collecting the polymer-monomer mixture in the separation vessel where the pressure in the reactor (or at least one reactor if more than one is in use) is between 7 and 100 MPa higher than the pressure in the separation vessel and the temperature in the separation vessel is above the crystallization temperature of the polymer or above 80° C if the polymer has no crystallization temperature, whichever is higher;

(f) separating the monomer-rich phase from the polymer-rich phase;

(g) recycling the separated monomer-rich phase to one or more reactors of (a); and (h) recovering polymer from the polymer-rich phase, wherein the residence time in the separation vessel is from 1 minute to 30 minutes.

49. A process for polymerizing olefins, comprising the steps of:

(a) contacting in one or more reactors, in a dense fluid homogeneous polymerization system, propylene present at 30 weight % or more (based upon the weight of the monomers and comonomers entering the reactor), with: 1) one or more catalyst compounds, 2) one or more activators, 3) from 0 to 50 mole % comonomer (based upon the amount of the monomers and comonomers entering the reactor), and 4) 0 to 40 wt % diluent or solvent (based upon the weight of the polymerization system), at a temperature above the crystallization temperature of the polymerization system and a pressure no lower than 1 MPa below the cloud point pressure of the polymerization system and less than 200 MPa, where the polymerization system comprises the monomers, any comonomer present, any diluent or solvent present, any scavenger present, and the polymer product;

(b) forming a reactor effluent comprising a polymer-monomer mixture;

(c) optionally heating the polymer-monomer mixture of (b) after it exits the reactor and before or after the pressure is reduced in step (e);

(d) collecting the polymer-monomer mixture of (b) in a separation vessel;

(e) reducing the pressure, at a rate of at least about 2 MPa/sec, of the reactor effluent comprising the polymer-monomer mixture of (b) below the cloud point pressure to form a two-phase mixture comprising a polymer-rich phase and a monomer-rich phase either before or after collecting the polymer-monomer mixture in the separation vessel where the pressure in the reactor (or at least one reactor if more than one is in use) is between 7 and 100 MPa higher than the pressure in the separation vessel and the temperature in the separation vessel is above the crystallization temperature of the polymer or above 80° C if the polymer has no crystallization temperature, whichever is higher;

(f) separating the monomer-rich phase from the polymer-rich phase;

(g) recycling the separated monomer-rich phase to one or more reactors of (a);

(h) recovering polymer from the polymer-rich phase; and (i) removing polymer having an Mw of 10,000 g/mol or less from the separated monomer-rich phase recycled in step (g).

50. The process of claim 49, wherein the polymer having an Mw of 10,000 g/mol or less is removed through the use of at least one knock-out pot.

* * * * *